(12) United States Patent
Lee

(10) Patent No.: US 6,947,109 B2
(45) Date of Patent: Sep. 20, 2005

(54) LIQUID CRYSTAL DISPLAY DEVICE

(75) Inventor: Won-Kyu Lee, Seongnam-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 54 days.

(21) Appl. No.: 10/445,427

(22) Filed: May 27, 2003

(65) Prior Publication Data

US 2004/0051826 A1 Mar. 18, 2004

(30) Foreign Application Priority Data

Sep. 18, 2002 (KR) .............................. 10-2002-0057048

(51) Int. Cl.$^7$ ......................................... G02F 1/1335
(52) U.S. Cl. ................................................... 349/113
(58) Field of Search ................................. 349/113, 114

(56) References Cited

U.S. PATENT DOCUMENTS

| | | | |
|---|---|---|---|
| 6,798,480 B2 * | 9/2004 | Ono et al. .................... | 349/115 |
| 2002/0075423 A1 | 6/2002 | Fujino | |
| 2002/0163609 A1 * | 11/2002 | Sakamoto et al. ........... | 349/113 |
| 2002/0196396 A1 * | 12/2002 | Sakamoto et al. .......... | 349/113 |
| 2003/0007113 A1 * | 1/2003 | Yamanaka et al. .......... | 349/113 |
| 2003/0038907 A1 * | 2/2003 | Ikeno et al. ................. | 349/113 |
| 2003/0048399 A1 * | 3/2003 | Okumura ..................... | 349/113 |
| 2003/0058388 A1 * | 3/2003 | Nakayoshi et al. .......... | 349/113 |
| 2004/0012736 A1 * | 1/2004 | Jeon et al. ................... | 349/113 |
| 2004/0051828 A1 * | 3/2004 | Sakamoto et al. ........... | 349/113 |
| 2004/0070709 A1 * | 4/2004 | Kanou et al. ................ | 349/113 |

FOREIGN PATENT DOCUMENTS

| | | |
|---|---|---|
| EP | 1205786 | 5/2002 |
| JP | 00292785 | 10/2000 |

OTHER PUBLICATIONS

International Search Report.
With English Abstract.

* cited by examiner

Primary Examiner—James A Dudek
(74) Attorney, Agent, or Firm—F. Chau & Associates, LLC

(57) ABSTRACT

A reflective type or transmissive and reflective type LCD device enhances reflectivity of light in a plurality of directions. The LCD device includes a first substrate having a plurality of pixels, TFTs formed on the first substrate, an insulating layer, a reflective electrode, a second substrate opposite to the first substrate, and liquid crystal layer interposed between the first and second substrates. The reflective electrode includes a plurality of embossing members arranged repeatedly thereon to form an embossing pattern. The embossing members have inclined faces inclined asymmetrically in a plurality of directions, for example in a first, second, third and fourth directions. A viewing angle of the LCD device may be broaden in various directions regardless of an incident angle of light incident into the LCD device, and the reflectivity of the LCD device may be increased, thereby enhancing luminance of the LCD device.

24 Claims, 21 Drawing Sheets

B2

B3

B4

B5

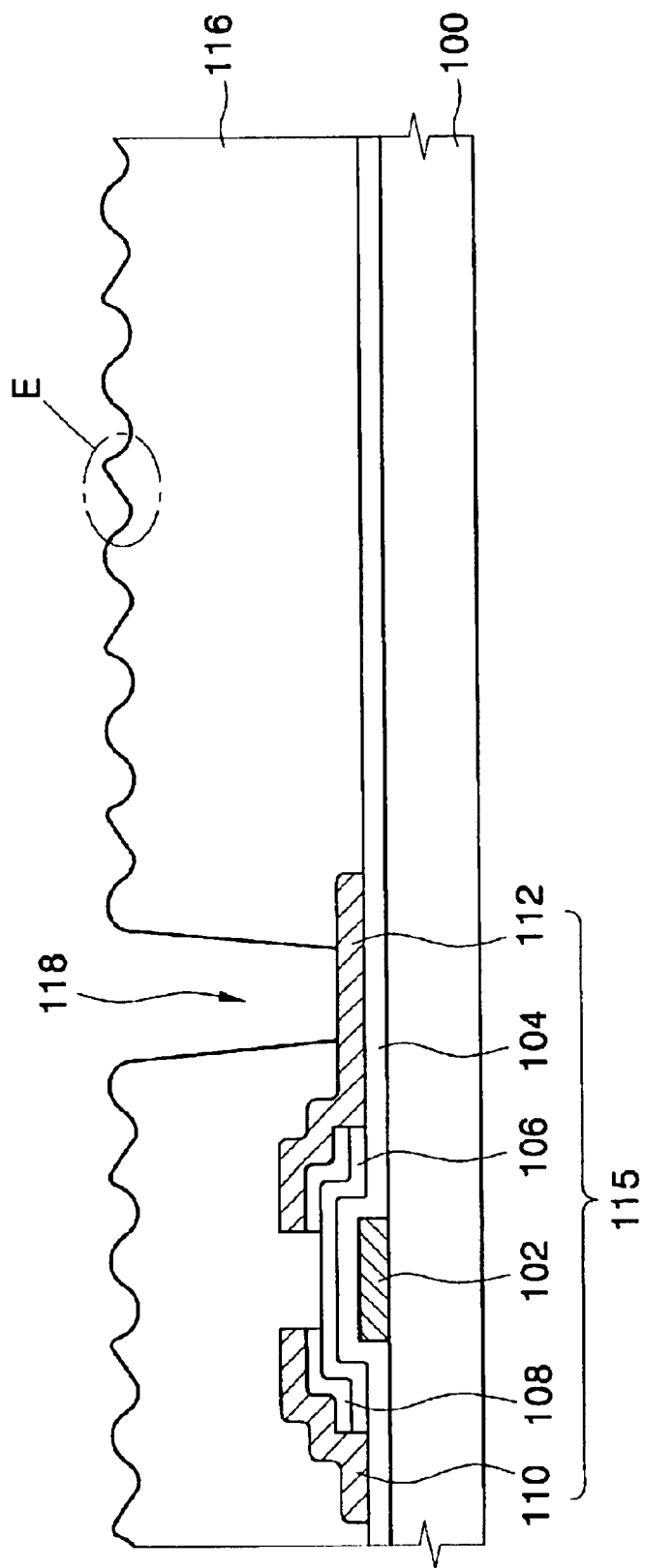

LIQUID CRYSTAL DISPLAY DEVICE

CROSS-REFERENCE TO RELATED APPLICATIONS

This application relies for priority upon Korean Patent Application No. 2002-57048 filed on Sep. 18, 2002, the contents of which are herein incorporated by reference in its entirety.

BACKGROUND OF THE INVENTION

1. Field of the Invention

The present disclosure relates to a reflective type or transmissive and reflective type liquid crystal display (LCD) device and a method of manufacturing the same, more particularly to a reflective type or transmissive and reflective type LCD device and a method of manufacturing the same in which reflectivity of light viewed from a plurality of directions is enhanced regardless of an incident angle of light incident into the LCD device.

2. Description of the Related Art

An LCD device has advantages over other display devices, for example CRT type display device. In detail, the LCD device may be manufactured in a thinner and lighter structure having a lower power consumption, may require a lower driving voltage compared with the other display devices, and may provide image display quality similar to that of the CRT type display device. The LCD device is widely used in various electronic apparatus.

The LCD device is classified into a transmissive type LCD device and a reflective type LCD device. The transmissive type LCD device uses internal light source such as backlight so as to display image, and the reflective type LCD device uses external light source such as a natural sunlight.

The reflective type LCD device needs lower power consumption and provides better display quality when image is displayed outdoors compared with the transmissive type LCD device. However, since the reflective type LCD device does not require external light source such as the backlight, the reflective type LCD device may have a thinner and lighter structure than the transmissive type LCD device.

In the reflective type LCD device, external light is reflected by reflective electrode comprised of a high reflective material such as aluminum (Al) or silver (Ag) for the purpose of image displaying.

Recently, in the reflective type LCD device and a reflective and transmissive type LCD device, two methods are simultaneously used so as to enhance the brightness of the LCD device. Reflectivity efficiency of the reflective electrode is enhanced according to a first method, and high opening ratio is provided according to a second method.

In the reflective type LCD device and a reflective and transmissive type LCD device, when the surface of reflection electrode does not have an embossing pattern but have a flat shape, the brightness of the LCD device varies according to the location on the reflective electrode onto which the external light is incident, so that the brightness of the LCD device may be high at a certain viewing angle. Accordingly, the reflective efficiency is reduced.

Therefore, a method in which the reflective electrode has embossing portions (bumps and dents) so as to enhance the reflective efficiency is disclosed in U.S. Pat. No. 5,610,741 (entitled "Reflection type Liquid Crystal Display Device with bumps on the reflector" and allowed to the inventor Naofumi Kimura).

FIG. 1A is a plan view showing a photomask pattern for forming a reflective electrode having embossing portions that have symmetrically inclined faces according to a conventional LCD device, and FIG. 1B is a sectional view cut along a line A1–A1' in FIG. 1A.

Referring to FIGS. 1A and 1B, the reflective electrode according to a conventional Thin Film Transistor (TFT) LCD device has convex portions formed in a convex region 10 and concave portions formed in a concave region 12.

The concave portion has a relatively lower height than the convex portion, and the concave region 12 may have a predetermined width. The convex portion has a relatively higher height than the concave portion, and to thereby function as a micro lens.

According to the conventional TFT LCD device of FIG. 1A, embossing portions are formed on an organic insulating layer of a TFT substrate by means of the photomask pattern of FIG. 1A so as to enhance the reflective efficiency, a reflective layer is coated on the organic insulating layer, and so that the reflective electrode is formed on the organic insulating layer to have embossing portions.

According to a structure of the reflective electrode in the conventional LCD device, since the micro lens has a polygonal isotropic structure, the reflective electrode of the conventional LCD device may have an isotropic reflectivity for a whole angle (360°) of directions. As a result, the reflectivity and display quality of an LCD panel are enhanced, so that the LCD panel provides a high brightness for whole angle of directions.

Light is anisotropically incident into the LCD panel when the electronic display devices using the LCD panel, for example a small (or middle) size of cellular phone or a personal digital assistant (PDA), are in use at an user's hand. The intensity of the light incident from user's body (or from 6 o'clock position with respect to the user) into the LCD panel is very weak since most of the light incident from user's body is screened by the user's body. However, the intensity of the light incident from 12 o'clock position with respect to the user is strong. When a reflective electrode having an isotropic reflectivity is employed in above electronic display devices, the reflective efficiency may not be optimized.

A reflector including surface deformity portions (convex portions and concave portions) each having asymmetric cross sections so as to enhance the reflective efficiency in a particular direction is disclosed in U.S. Pat. No. 6,097,458.

FIG. 2A is a plan view showing a photomask pattern for forming a reflective electrode having embossing portions that have faces inclined asymmetrically in a direction according to a conventional LCD device, and FIG. 2B is a cross-sectional view cut along a line A2–A2' in FIG. 2A. Especially, FIG. 2A shows a portion of the photomask pattern that is formed so as to enhance the reflectivity in a 12 o'clock direction.

Referring to FIG. 2A and FIG. 2B, the reflective electrode includes convex portions formed in a convex region 20 and concave portions formed in a concave region 22. In addition, slit patterns 24 are formed at a certain regions of the convex portions so as to enhance the reflectivity in a 12 o'clock direction. An exposure amount supplied to the regions of the convex portions is regulated through a slit exposure by using the diffraction of the light that passes through the slit patterns 24, so that a profile of the convex portion is asymmetric.

When the reflective electrode has slit patterns treated (arranged) in a first direction (for example 12 o'clock direction) by the slit exposure, the reflectivity increases in the first direction, but the reflectivity may not be enhanced in other directions (for example 9, 6, 3 o'clock directions). Especially, according to the conventional LCD device, the reflectivity and viewing angle cannot be enhanced in various directions.

SUMMARY OF THE INVENTION

Accordingly, the present invention is provided to substantially obviate one or more problems due to limitations and disadvantages of the related art.

It is one feature of the present invention to provide a reflective type or a reflective and transmissive type LCD device in which a reflectivity of the LCD device is enhanced in various directions regardless of an incident angle of light incident into the LCD device.

It is another feature of the present invention to provide a process of manufacturing a reflective type or a reflective and transmissive type LCD device in which a reflectivity of the LCD device is enhanced in various directions regardless of an incident angle of light incident into the LCD device.

According to an aspect of the present invention for achieving one feature of the present invention, there is provided a liquid crystal display device comprising a first substrate, an insulating layer, a reflective electrode, a second substrate and a liquid crystal. The insulating layer is formed on the first substrate. A first embossing member and a second embossing member are arranged repeatedly on the insulating layer to form a first embossing pattern. The first embossing member has a first inclined face inclined asymmetrically in a first direction. The second embossing member has a second inclined face inclined asymmetrically in a second direction. The reflective electrode is formed on the insulating layer. A third embossing member is arranged repeatedly on the reflective electrode to form a second embossing pattern. The third embossing member corresponds to the first and second embossing members. The second substrate faces the first substrate, and the liquid crystal layer is interposed between the first and second substrates.

According to anther aspect of the present invention for achieving one feature of the present invention, there is provided a liquid crystal display device comprising a first substrate, an insulating layer, a transmitting electrode, a reflective electrode, a second substrate and a liquid crystal. The first substrate includes a switching device. The insulating layer is formed on the first substrate. A first embossing member and a second embossing member are arranged repeatedly on the insulating layer to form a first embossing pattern. The first embossing member has a first inclined face inclined asymmetrically in a first direction, and the second embossing member has a second inclined face inclined asymmetrically in a second direction. The transmitting (or transparent) electrode is formed on the insulating layer, a third embossing member is arranged repeatedly on the transmitting electrode to form a second embossing pattern, and the third embossing member corresponds to the first and second embossing members. The reflective electrode is formed on a portion of the transmitting electrode. A fourth embossing member is arranged repeatedly on the reflective electrode to form a third embossing pattern. The fourth embossing member corresponds to the third embossing member, and a contact hole electrically coupled with the switching device is formed on the portion of the transmitting electrode. The second substrate faces the first substrate, and the liquid crystal layer is interposed between the first and second substrates.

According to still anther aspect of the present invention for achieving one feature of the present invention, there is provided a liquid crystal display device comprising a first substrate, a second substrate, a liquid crystal layer interposed between the first and second substrates, an insulating layer and a reflective electrode. The first substrate has a plurality of pixel arranged in a matrix shape. The second substrate faces the first substrate and includes a red color filter, a green color filter and a blue color filter arranged repeatedly thereon, the red, green and blue color filters corresponds to each of the pixels. The insulating layer is formed on the first substrate, a first embossing member is arranged repeatedly on the insulating layer to form a first embossing pattern, the first embossing member has a plurality of inclined faces inclined asymmetrically in a plurality of direction, and the first embossing pattern corresponds to each of the red, green and blue color filters. The reflective electrode is formed on the insulating layer. A second embossing member is arranged repeatedly on the reflective electrode to form a second embossing pattern. The second embossing member corresponds to the first embossing member.

According to still anther aspect of the present invention for achieving one feature of the present invention, there is provided a liquid crystal display device comprising a first substrate, a second substrate, a liquid crystal layer interposed between the first and second substrates, an insulating layer, a transmitting electrode and a reflective electrode. The first substrate has a plurality of pixel arranged in a matrix shape. The second substrate faces the first substrate and including a red color filter, a green color filter and a blue color filter arranged repeatedly thereon. The red, green and blue color filters corresponds to each of the pixels. The insulating layer is formed on the first substrate. A first embossing member is arranged repeatedly on the insulating layer to form a first embossing pattern. The first embossing member has a plurality of inclined faces inclined asymmetrically in a plurality of direction. The first embossing pattern corresponds to each of the red, green and blue color filters. The transmitting electrode is formed on the insulating layer. A second embossing member is arranged repeatedly on the transmitting electrode to form a second embossing pattern. The second embossing member corresponds to the first embossing member. The reflective electrode is formed on a portion of the transmitting electrode. A third embossing member is arranged repeatedly on the reflective electrode to form a third embossing pattern. The third embossing member corresponds to the second embossing member. A contact hole electrically coupled with the switching device is formed on the portion of the transmitting electrode.

According to an aspect of the present invention for achieving another feature of the present invention, there is provided a method of manufacturing a liquid crystal display device. After forming a switching device on a substrate, an insulating layer is formed on the substrate having the switching device. A first embossing member and a second embossing member is arranged repeatedly on the insulating layer to form a first embossing pattern. The first embossing member has a first inclined face inclined asymmetrically in a first direction, and the second embossing member has a second inclined face inclined asymmetrically in a second direction. A reflective electrode is formed on the insulating layer. A third embossing member is arranged repeatedly on the reflective electrode to form a second embossing pattern. The third embossing member corresponds to the first and second embossing members.

According to another aspect of the present invention for achieving another feature of the present invention, there is provided a method of manufacturing a liquid crystal display device. After forming a switching device on a substrate, an insulating layer is formed on the substrate having the switching device. A first embossing member and a second embossing member are arranged repeatedly on the insulating layer to form a first embossing pattern. The first embossing member has a first inclined face inclined asymmetrically in a first direction. The second embossing member has a second inclined face inclined asymmetrically in a second direction. A transmitting electrode is formed on the insulating layer. A third embossing member is arranged repeatedly on the transmitting electrode to form a second embossing pattern. The third embossing member corresponds to the first and second embossing members. A reflective electrode is formed on a portion of the transmitting electrode. A fourth embossing member is arranged repeatedly on the reflective electrode to form a third embossing pattern. The fourth embossing member corresponds to the third embossing member. A contact hole electrically coupled with the switching device is formed on the portion of the transmitting electrode.

According to still another aspect of the present invention, there is provided a liquid crystal display device including a first substrate, an insulating layer, a reflective electrode, a second substrate and a liquid crystal layer. The insulating layer is formed on the first substrate. The insulating layer includes a first embossing member and a second embossing member arranged repeatedly thereon to form a first embossing pattern. The first embossing member has a first inclined face, and the second embossing member has a second inclined face. The second inclined face is asymmetrically inclined with respect to the first inclined face, and cross-sections of the first and second embossing members have polygonal shapes. The reflective electrode is formed on the insulating layer. The third embossing member is arranged repeatedly on the reflective electrode to form a second embossing pattern. The third embossing member corresponds to the first and second embossing members. The second substrate faces the first substrate, and the liquid crystal layer is interposed between the first and second substrates.

According to still another aspect of the present invention, there is provided a liquid crystal display device including a first substrate, an insulating layer, a transmitting electrode, a reflective electrode, a second substrate and a liquid crystal layer. The first substrate includes a switching device. The insulating layer is formed on the first substrate, the insulating layer includes a first embossing member and a second embossing member arranged repeatedly thereon to form a first embossing pattern. The first embossing member has a first inclined face, and the second embossing member has a second inclined face. The second inclined face is asymmetrically inclined with respect to the first inclined face, and cross-sections of the first and second embossing members have polygonal shapes. The transmitting electrode is formed on the insulating layer. A third embossing member is arranged repeatedly on the transmitting electrode to form a second embossing pattern. The third embossing member corresponds to the first and second embossing members. The reflective electrode is formed on a portion of the transmitting electrode. A fourth embossing member is arranged repeatedly on the reflective electrode to form a third embossing pattern. The fourth embossing member corresponds to the third embossing member, and a contact hole electrically coupled with the switching device is formed on the portion of the transmitting electrode. The second substrate faces the first substrate, and the liquid crystal layer is interposed between the first and second substrates.

As described above, according to the LCD device of this invention, the reflective type or the reflective and transmissive type LCD device includes a plurality of embossing portions arranged repeatedly on the reflection electrode to form an embossing pattern. Each of the embossing portions has inclined faces inclined asymmetrically in various directions, for example 12 o'clock, 9 o'clock, 6 o'clock and 3 o'clock directions.

Accordingly, a viewing angle of the LCD device can be broadened and a reflectivity of the LCD device can be enhanced in various directions regardless of an incident angle of light incident into the LCD device.

In addition, inclined faces of the embossing portions in the embossing pattern may be inclined asymmetrically in various directions other than 12 o'clock, 9 o'clock, 6 o'clock and 3 o'clock directions so that the reflectivity and the viewing angle may be enhanced in various directions corresponding to requirements from users.

In addition, even when only one color selected from the red (R), green (G) and blue (B) colors is displayed on the LCD panel, the reflectivity may not have a high value in only one particular direction, and the reflectivity can be enhanced in whole directions so as to prevent the reflectivity from having a high value in only one particular direction.

BRIEF DESCRIPTION OF THE DRAWINGS

The above objects and other advantages of the present invention will become more apparent by describing in detail the preferred embodiments thereof with reference to the accompanying drawings, in which:

FIGS. 11A, 11B, 11C and 11D are cross-sectional views showing a process of manufacturing the LCD panel of FIG. 10;

DESCRIPTION OF THE PREFERRED EMBODIMENTS

Hereinafter the preferred embodiment of the present invention will be described in detail with reference to the accompanying drawings.

Figure 1A:
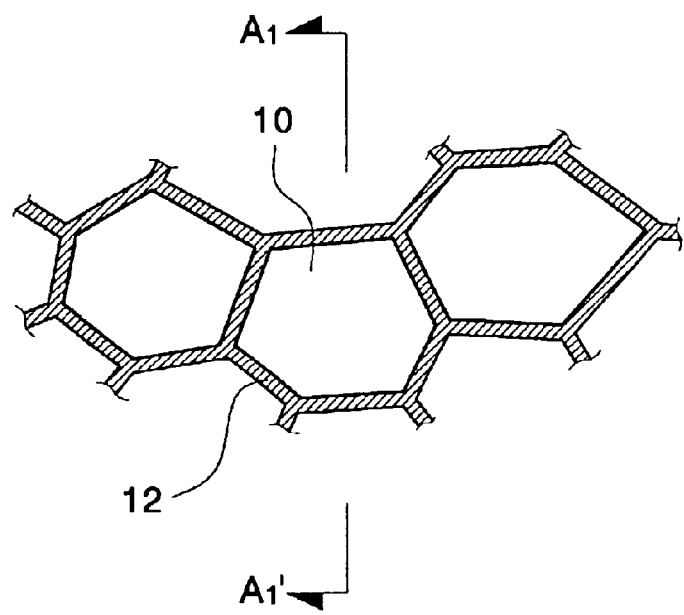
FIG. 1A is a plan view showing a photomask pattern for forming a reflective electrode having embossing portions that have symmetrically inclined face according to a conventional LCD device.
Figure 1B:
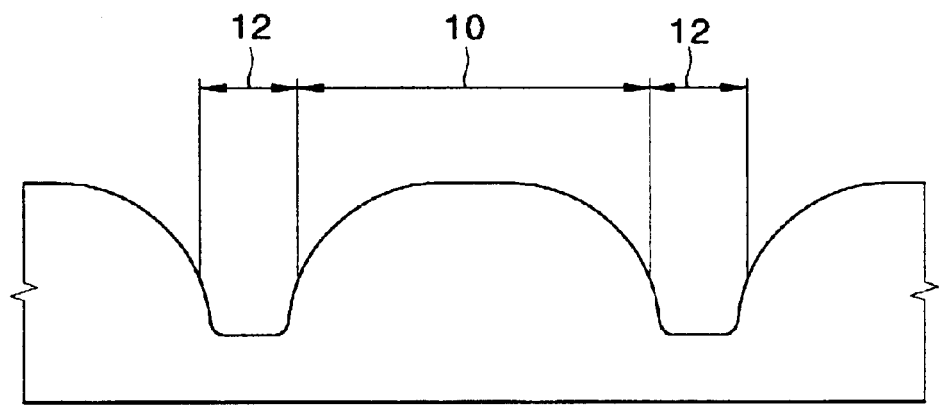
FIG. 1B is a cross-sectional view cut along a line A1–A1' in FIG. 1A.
Figure 2A:
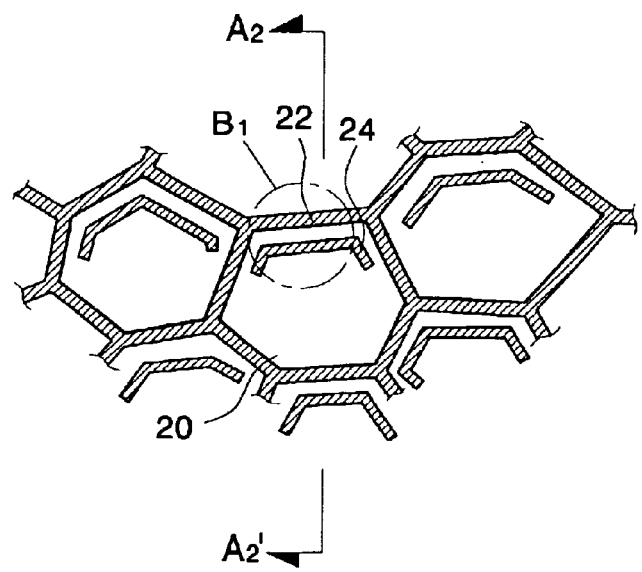
FIG. 2A is a plan view showing a photomask pattern for forming a reflective electrode having embossing portions that have faces inclined asymmetrically in a direction according to a conventional LCD device.
Figure 2B:
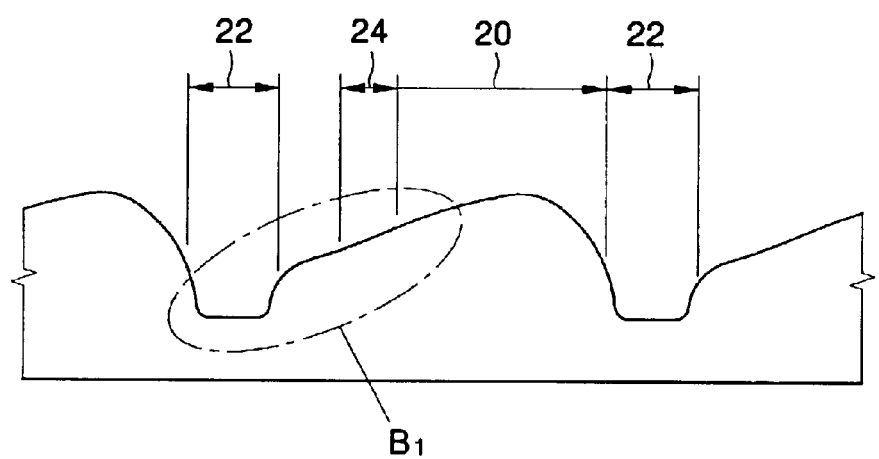
FIG. 2B is a cross-sectional view cut along a line A2–A2' in FIG. 2A.
Figure 3:
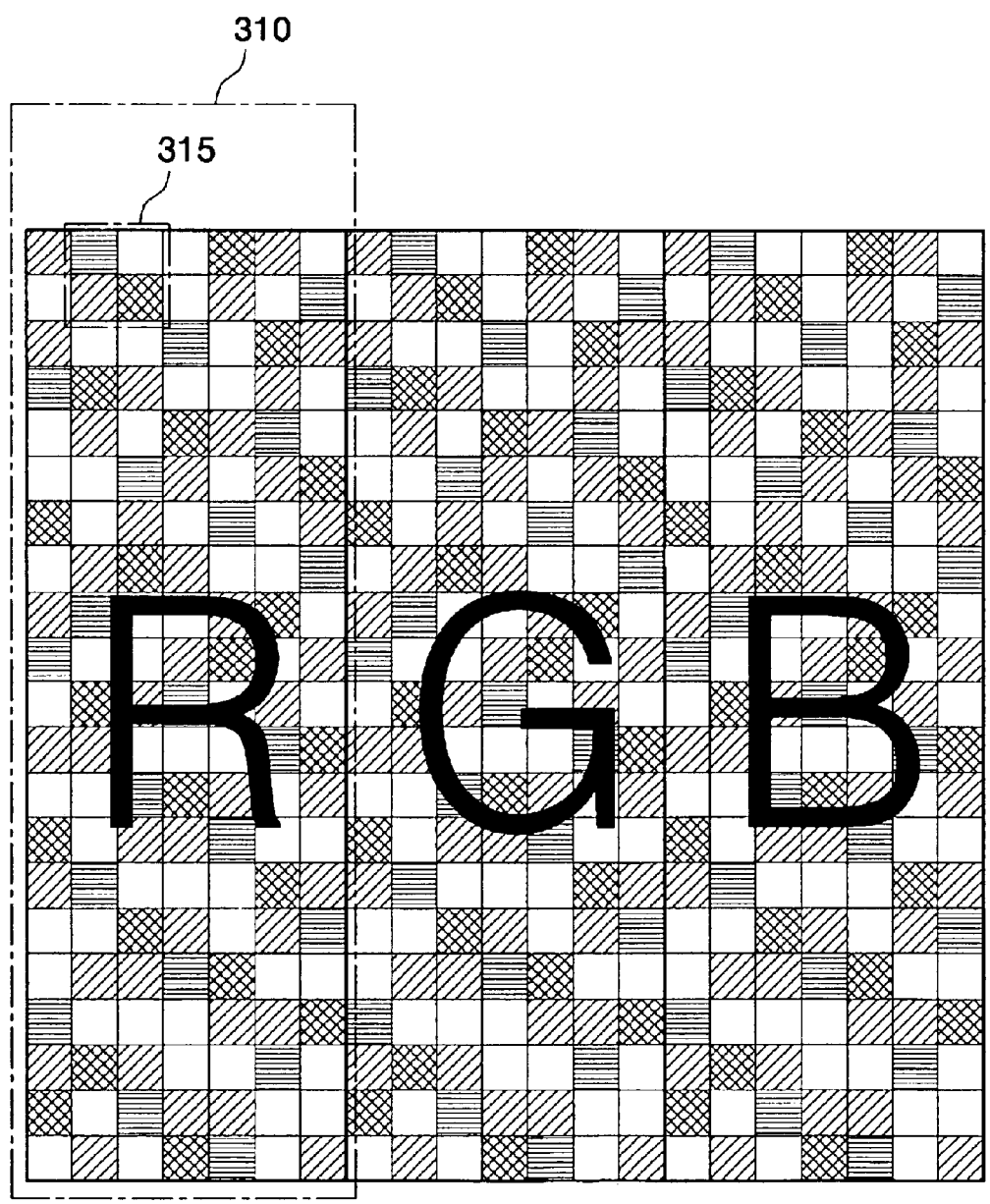
FIG. 3 is a plan view showing a photomask pattern of one pixel for forming a reflective electrode having embossing portions that have faces inclined asymmetrically in a plurality of directions according to one exemplary embodiment of the present invention.

FIG. 3 is a plan view showing a photomask pattern of one pixel for forming a reflective electrode having embossing portions that have faces inclined asymmetrically in a plurality of directions according to one exemplary embodiment of the present invention.

Referring to FIG. 3, in a reflective type or a reflective and transmissive type LCD devices, one pixel comprised of red (R), green (G) and blue (B) dots is divided into a plurality of regions by means of a photomask pattern. A reflective electrode is formed in the pixel and includes a plurality of embossing portions. Each of the embossing portions is formed on each of the regions of the pixel and is formed via a slit exposure process to have inclined faces inclined asymmetrically in a plurality of directions. For example, each of the red (R), green (G) and blue (B) dots includes 7*21 regions, and each of the regions has an aspect ratio of 1:3. In addition, one pixel may be comprised of 3 dots such as red (R), green (G) and blue (B) dots. The dot comprised of above embossing portions is arranged repeatedly as a basic unit so as to provide the reflective type or reflective and transmissive type LCD devices.

Each of the regions includes a plurality of embossing portions, for example a first, second, third and fourth embossing portions treated by the slit exposure to have inclined faces inclined asymmetrically in 12, 9, 6 and 3 o'clock directions with respect to a user that holds an electronic device employing an LCD panel, respectively. A '▤' of FIG. 3 represents a first region 301. The first region 301 includes an embossing portion treated by the slit exposure to have an inclined face inclined asymmetrically in 3 o'clock direction (hereinafter referred to as 3 o'clock direction embossing portion). A '▨' of FIG. 3 represents a second region 303. The second region 303 includes an embossing portion formed by the slit exposure to have an inclined face inclined asymmetrically in 6 o'clock direction (hereinafter referred to as 6 o'clock direction embossing portion). A '▧' of FIG. 3 represents a third region 305. The third region 305 includes an embossing portion formed by the slit exposure to have an inclined face inclined asymmetrically in 9 o'clock direction (hereinafter referred to as 9 o'clock direction embossing portion). A '□' of FIG. 3 represents a fifth region 307. The fifth region 307 includes an embossing portion treated by the slit exposure to have an inclined face inclined asymmetrically in 12 o'clock direction (hereinafter referred to as 12 o'clock direction embossing portion).

As shown in FIG. 3, regarding to each of the red (R), green (G) and blue (B) dots, for example, a ratio of regions having 3 and 9 o'clock direction embossing portions to the total regions is about 14.3% (or 21/147), a ratio of regions having 6 o'clock direction embossing portions to the total regions is about 28.3% (or 42/147), a ratio of regions having 12 o'clock direction embossing portions to the total regions is about 42.8%. Accordingly, the reflectivity may be maximized in 12 o'clock direction, and the reflectivity may be increased in 4 directions (12, 9, 6 and 3 o'clock directions).

Although the above embodiments show the reflectivity enhanced in 12 o'clock direction, the reflectivity could also be enhanced in 9, 3 or 6 o'clock directions by relocating the 12, 9, 6 and 3 o'clock direction embossing portions on the regions of one pixel, or the reflectivity could also be enhanced in any other directions known to one of the ordinary skill in the art.

Figure 4A:
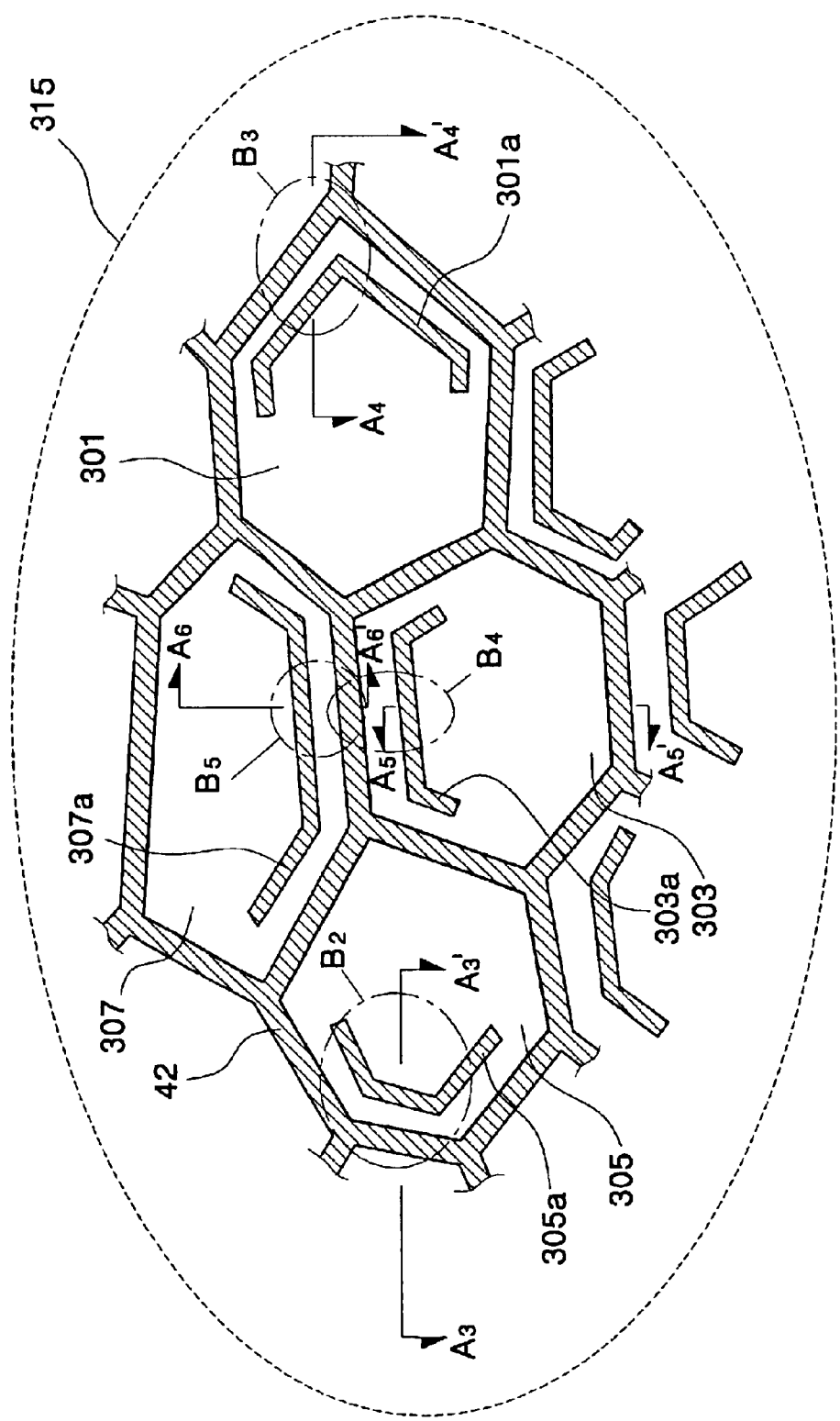
FIG. 4A is a partially enlarged view of a portion 315 in FIG. 3 according to one exemplary embodiment of the present invention.

FIG. 4A is a partially enlarged view of 315 in FIG. 3 according to one exemplary embodiment of the present invention, FIGS. 5, 6, 7 and 8 are a cross-sectional view cut along a line A3–A3', A4–A4', A5–A5' and A6–A6' in FIG. 3, respectively.

Figure 5:
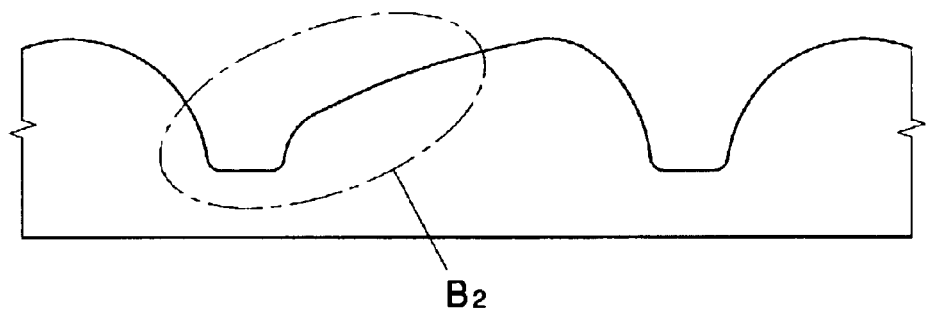
FIG. 5 is a cross-sectional view cut along a line A3–A3' in FIG. 3.

Referring to FIGS. 4A and 5, a third slit pattern 305a is formed on the third region 305 of the photomask pattern. The third slit pattern 305a is used to form inclined faces inclined asymmetrically in 9 o'clock direction on embossing portions of the reflective electrode of a TFT substrate through slit exposure.

Figure 6:
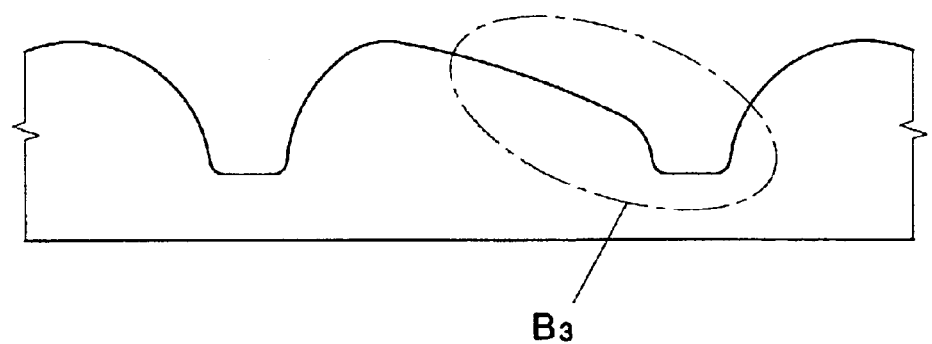
FIG. 6 is a cross-sectional view cut along a line A4–A4' in FIG. 3.

Referring to FIGS. 4A and 6, a first slit pattern 301a is formed on the first region 301 of the photomask pattern. The first slit pattern 301a is used to form inclined faces inclined asymmetrically in 3 o'clock direction on embossing portions of the reflective electrode of the TFT substrate through slit exposure. As shown in 'B3' of FIG. 6, the embossing portion has inclined face inclined asymmetrically in 3 o'clock direction.

Figure 7:
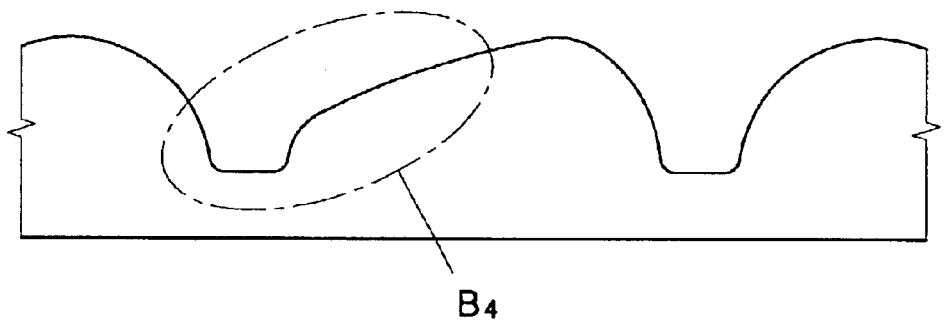
FIG. 7 is a cross-sectional view cut along a line A5–A5' in FIG. 3.

Referring to FIGS. 4A and 7, a fourth slit pattern 307a is formed on the fourth region 307 of the photomask pattern. The fourth slit pattern 307a is used to form inclined faces inclined asymmetrically in 12 o'clock direction on embossing portions of the reflective electrode of the TFT substrate through slit exposure. As shown in 'B4' of FIG. 7, the embossing portion has inclined faces inclined asymmetrically in 12 o'clock direction.

Figure 8:
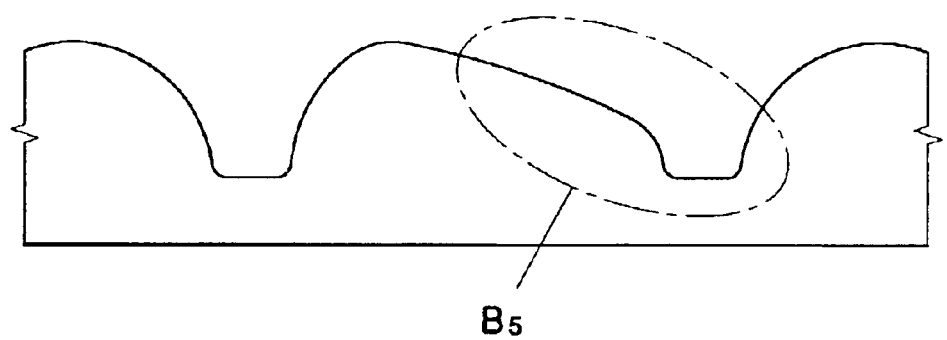
FIG. 8 is a cross-sectional view cut along a line A6–A6' in FIG. 3.

Referring to FIGS. 4A and 8, a second slit pattern 303a is formed on the second region 303 of the photomask pattern. The second slit pattern 303a is used to form inclined faces inclined asymmetrically in 6 o'clock direction on embossing portions of the reflective electrode of the TFT substrate through slit exposure. As shown in 'B5' of FIG. 8, the embossing portion has inclined faces inclined asymmetrically in 6 o'clock direction.

Concave portions formed on the reflective electrode of the TFT substrate corresponds to a concave region 42 of the embossing pattern.

According to above embodiments, embossing portions has inclined face inclined asymmetrically not only in 12 o'clock direction but also in 9, 6 and 3 o'clock directions, and the reflectivity of the LCD device may be enhanced in various directions.

Although the above embodiments discuss the reflectivity enhanced in 12, 9, 3 and 6 o'clock directions, embossing portions having inclined faces inclined asymmetrically 1, 2, 4, 5, 7, 8, 10 and 11 o'clock directions could also be formed on the reflective electrode of the TFT substrate so as to enhance the reflectivity in 1, 2, 4, 5, 7, 8, 10 and 11 o'clock directions. In addition, the number and location of each of the 12, 9, 6 and 3 o'clock direction embossing portions may be varied so as to enhance the reflectivity and the viewing angle according to user's requirements.

Figure 4B:
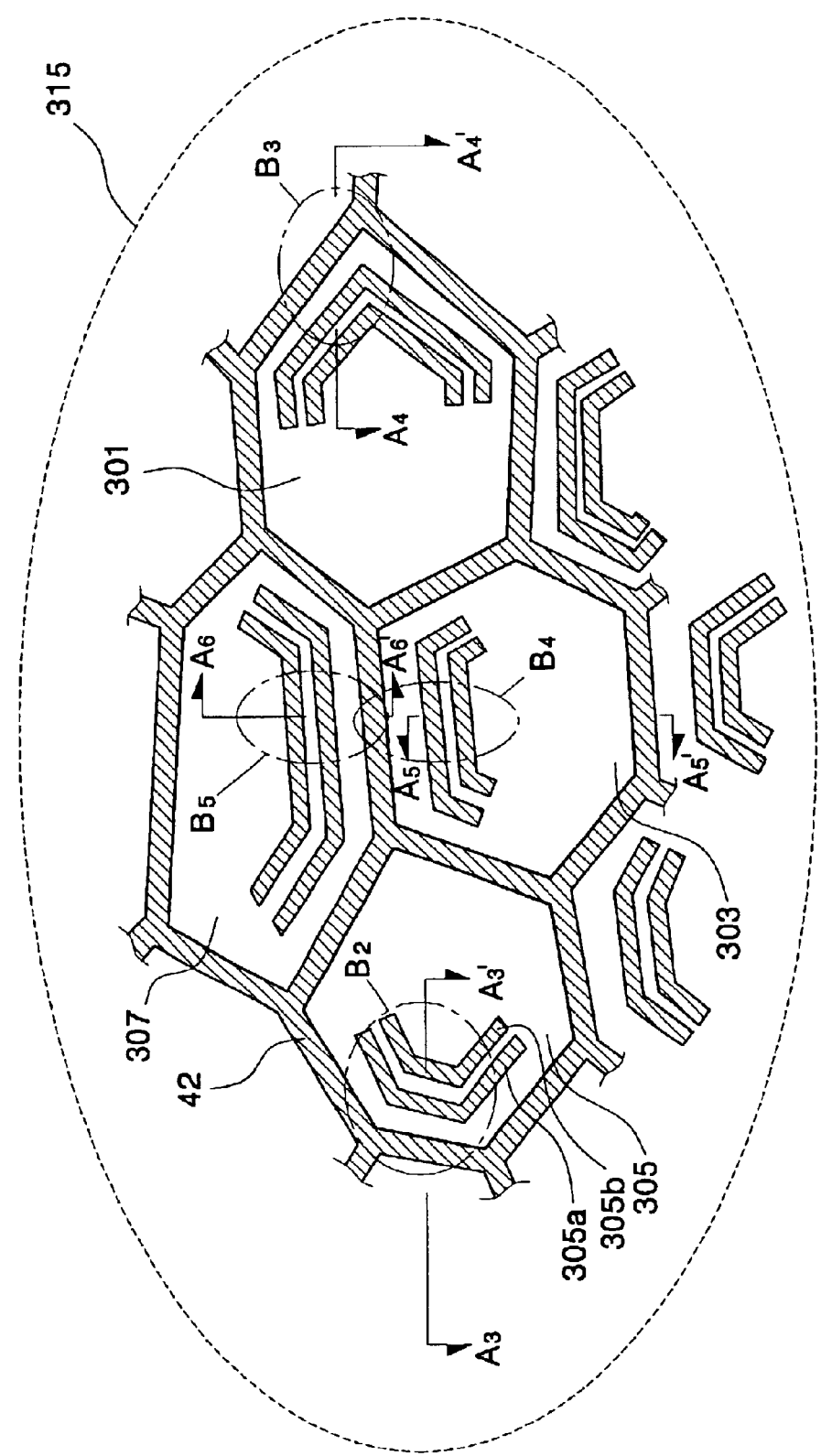
FIGS. 4B, 4C, 4D and 4E are partially enlarged views of a portion 315 in FIG. 3 according to another exemplary embodiments of the present invention.

A slit pattern may be formed on the first, second, third and fourth regions 301, 303, 305 and 307, or two slit patterns may be formed on the first, second, third and fourth regions 301, 303, 305 and 307 as shown in FIG. 4B so as to form embossing portions having inclined faces inclined asymmetrically. A width of the slit pattern 305a may be the same to that of the slit pattern 305b or different from that of the slit pattern 305b.

Figure 4C:
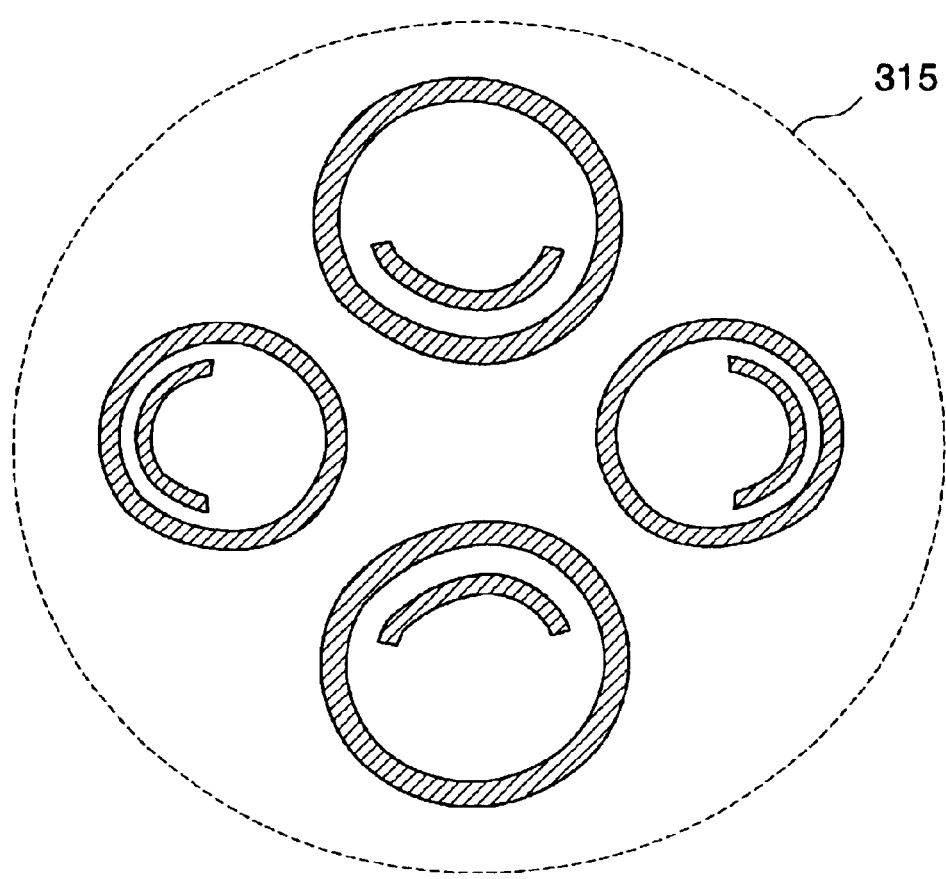
Figure 4D:
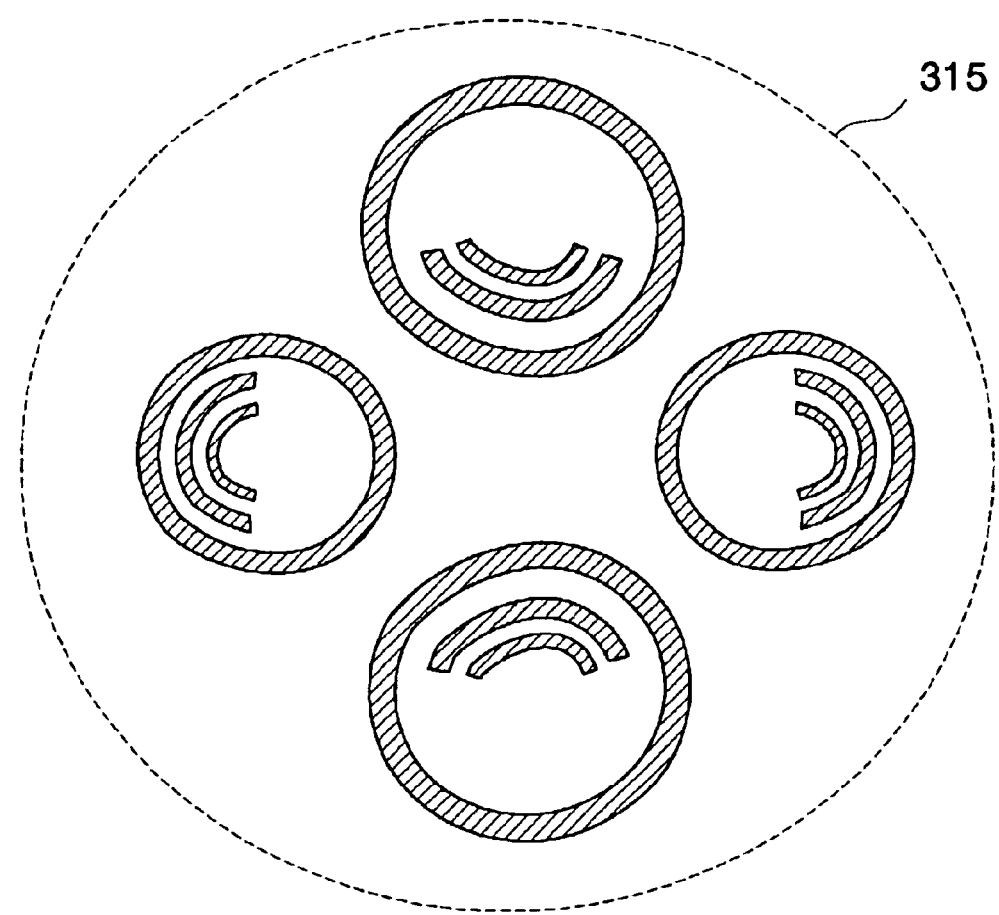
Figure 4E:
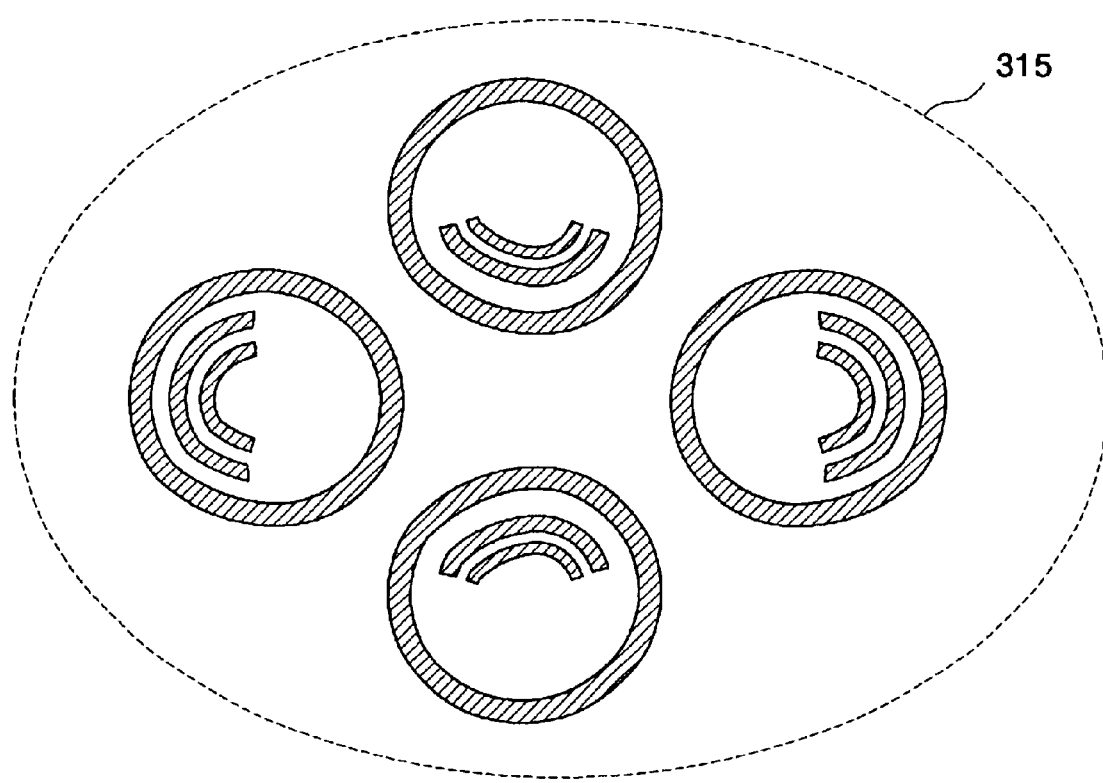

As shown in FIGS. 4A and 4B, although the above embodiments show photomask patterns having a polygonal structure for forming embossing portions, the photomask pattern could have a circular (or elliptical) structure, a substantially circular (or elliptical) structure as shown in FIGS. 4C, 4D and 4E, or any other structures known to one of the ordinary skill in the art may also be utilized in place of or in conjunction with the photomask pattern having a polygonal structure.

Referring to FIGS. 4C, 4D and 4E, the photomask pattern may have same size of embossing portions with circular (or elliptical) structure or a substantially circular (or elliptical) structure as shown in FIG. 4E. However, the photomask pattern may have different size of embossing portions with circular (or elliptical) structure or a substantially circular (or elliptical) structure as shown in FIGS. 4C, 4D and 4E.

Preferably, widths of the slit patterns 301a, 303a, 305a and 307a is thinner than the widths of the concave region 42 of the embossing pattern.

The third slit pattern 305a formed on the third region 305 of the photomask pattern is used to form inclined faces inclined asymmetrically in 9 o'clock direction on embossing portions of the reflective electrode of the TFT substrate through slit exposure. As shown in 'B2' of FIG. 5, the embossing portion has inclined face inclined asymmetrically in 9 o'clock direction.

Figure 9:
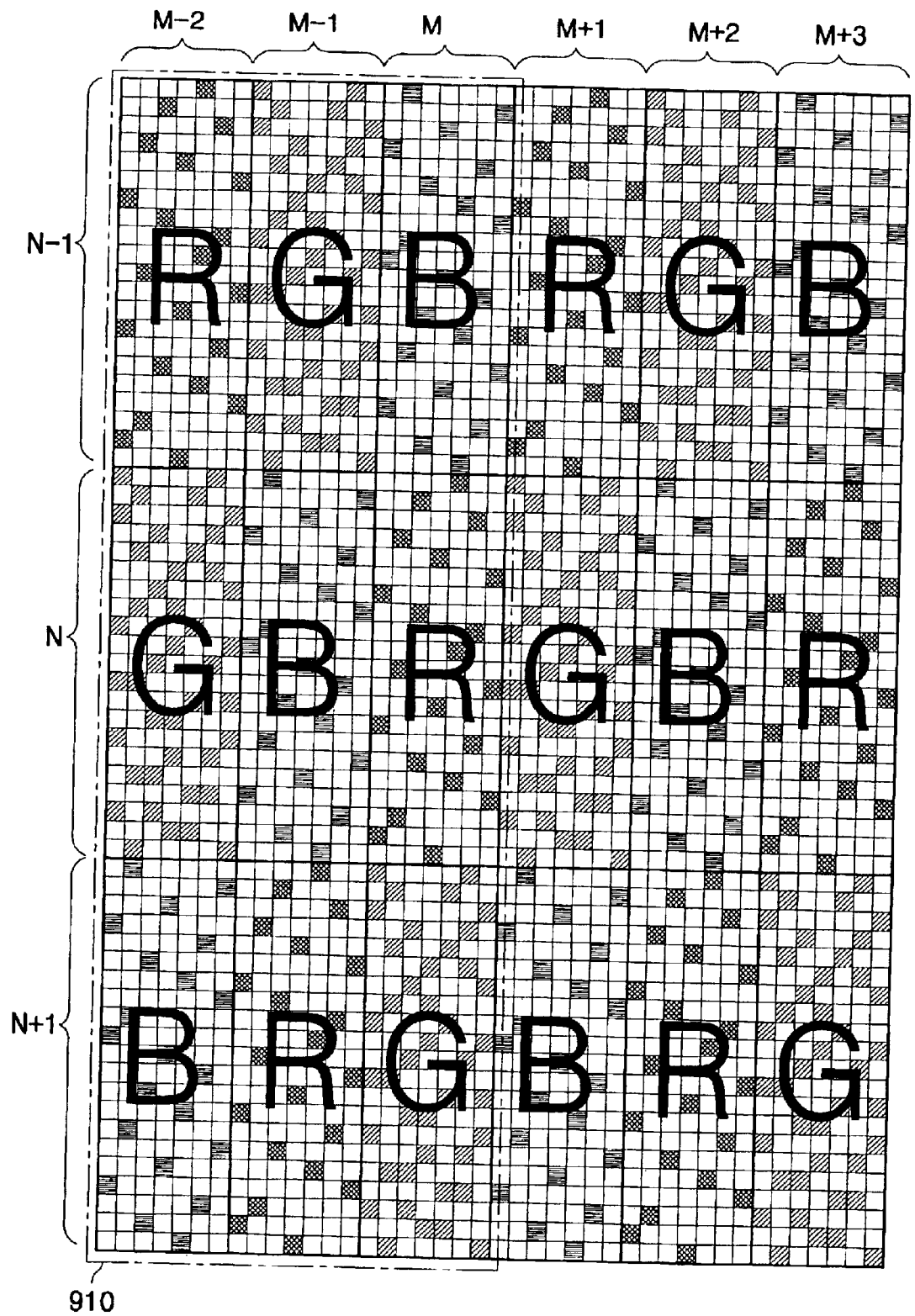
FIG. 9 is a plan view showing a photomask pattern of pixels for forming reflective electrodes each having embossing portions that have faces inclined asymmetrically in a plurality of directions according to another exemplary embodiment of the present invention.

FIG. 9 is a plan view showing a photomask pattern of pixels for forming reflective electrodes each having embossing portions that have faces inclined asymmetrically in a plurality of directions according to another exemplary embodiment of the present invention.

Referring to FIG. 9, in the reflective type or reflective and transmissive type LCD device, a pixel region in which three dots are formed by means of the photomask pattern is arranged repeatedly. Embossing portions for enhancing the reflectivity in substantially 9 and 12 o'clock directions are formed on a red (R) dot in a (N−1)th row, embossing portions for enhancing the reflectivity in substantially 6 and 12 o'clock directions are formed on a green (G) dot in a (N−1)th row, and embossing portions for enhancing the reflectivity in substantially 3 and 12 o'clock directions are formed on a blue (B) dot in a (N−1)th row.

In FIG. 3, embossing portions for enhancing the reflectivity in whole directions, for example 12, 9, 6 and 3 o'clock directions, are formed on each of the red (R), green (G) and blue (B) dots dot. However, in FIG. 9, the reflectivity of the LCD device is enhanced in whole directions, for example 12, 9, 6 and 3 o'clock directions, not by means of only one dot (red (R), green (G) or blue (B) dots) but by means of three dots (red (R), green (G) and blue (B) dots) all together.

When only (N−1)th row of dots in FIG. 9 are arranged repeatedly in a whole display region of an LCD panel and only one color of red (R), green (G) and blue (B) colors is displayed in the whole display region, the reflectivity is enhanced in a particular direction. For example, when only red (R) color is shown in the whole display region, the reflectivity is enhanced only in 9 and 12 o'clock directions. When only green (G) color is shown in the whole display region, the reflectivity is enhanced only in 6 and 12 o'clock directions. When only blue (B) color is shown in the whole display region, the reflectivity is enhanced only in 3 and 12 o'clock directions.

Accordingly, Nth and (N+1)th rows of dots in FIG. 9 are added to the Nth row of dot in a whole display region of an LCD panel. For example, each of the red (R), green (G) and blue (B) dots is shifted left or right by one dot in the Nth row with respect to the red (R), green (G) and blue (B) dots of (N−1)th row. Accordingly, regarding to the Nth row, the reflectivity is enhanced in 6 and 12 o'clock directions by means of the red (R) dot, the reflectivity is enhanced in 3 and 12 o'clock directions by means of the green (G) dot, and the reflectivity is enhanced in 9 and 12 o'clock directions by means of the blue (B) dot. In addition, each of the red (R), green (G) and blue (B) dots is shifted left or right by one dot in the (N+1)th row with respect to the red (R), green (G) and blue (B) dots of the Nth row. Accordingly, regarding to the (N+1)th row, the reflectivity may be enhanced in 3 and 12 o'clock directions by means of the red (R) dot, the reflectivity may be enhanced in 9 and 12 o'clock directions by means of the green (G) dot, and the reflectivity may be enhanced in 6 and 12 o'clock directions by means of the blue (B) dot.

Therefore, when only one color of red (R), green (G) and blue (B) colors is displayed in the whole display region, the reflectivity may be enhanced in various directions. For example, when only red (R) color is shown in the whole display region, the reflectivity is enhanced in 9 and 12 o'clock directions by means of the (N−1)th row of dots, the reflectivity is enhanced in 6 and 12 o'clock directions by means of the Nth row of dots, and the reflectivity is enhanced in 3 and 12 o'clock directions by means of the (N+1)th row of dots. Accordingly, when only red (R) color is shown in the whole display region, the reflectivity can be enhanced in various directions including 12, 9, 6 and 3 o'clock directions. In addition, when only green (G) and blue (B) colors are shown in the whole display region, the reflectivity can be enhanced in various directions.

Figure 10:
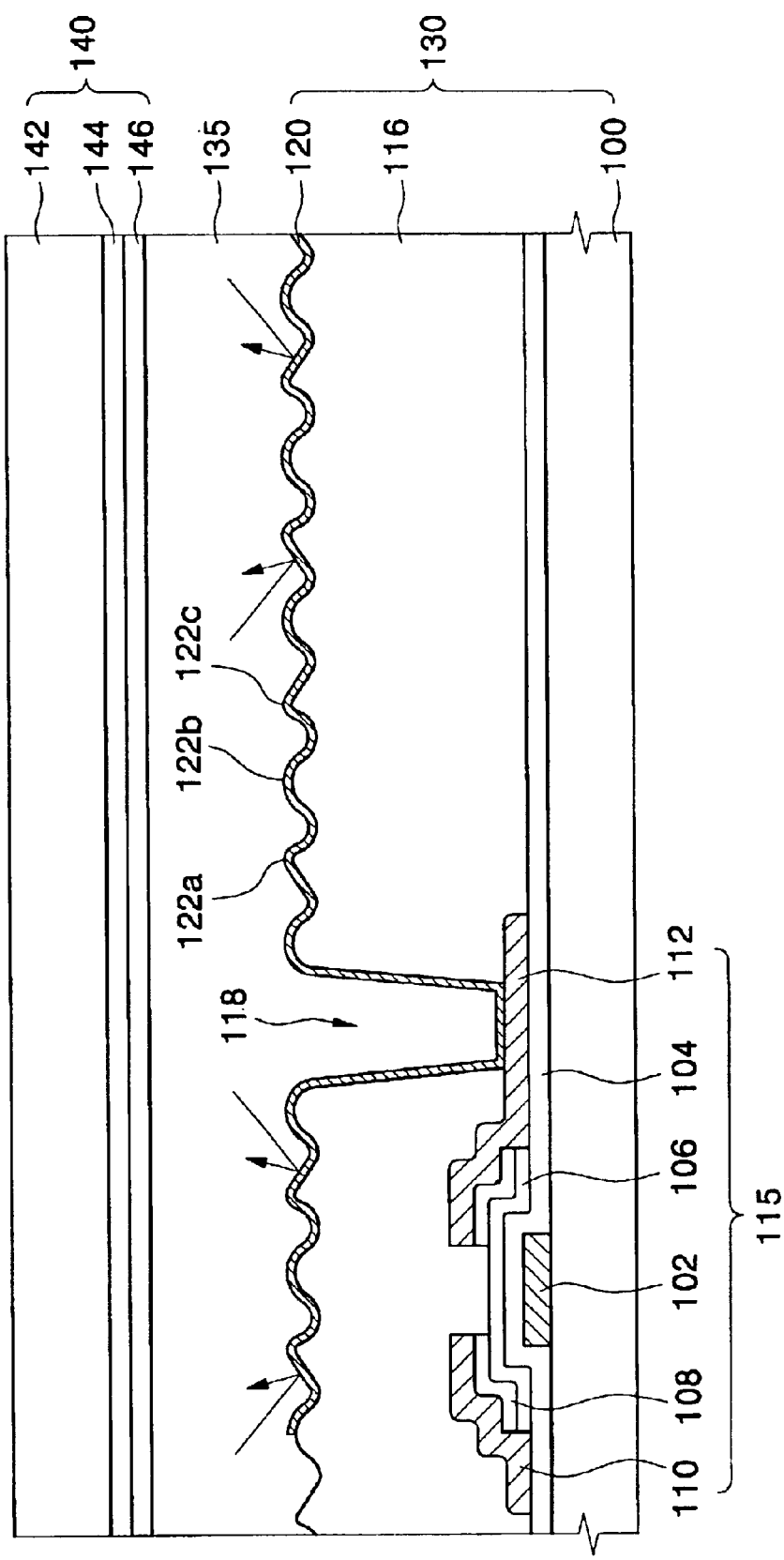
FIG. 10 is a cross-sectional view showing one pixel of a reflective type LCD panel having the reflective electrode that has the embossing pattern in FIG. 4A.

FIG. 10 is a cross-sectional view showing one pixel of a reflective type LCD panel having the reflective electrode that has the embossing pattern in FIG. 4A.

Referring to FIG. 10, the LCD panel includes a first substrate (or thin film transistor substrate) 130 having a plurality of pixels, a second substrate 140 facing the first substrate 130, a liquid crystal layer 135 interposed between the first and second substrates 130 and 140, and a reflective electrode (or pixel electrode) 120 formed between the first substrate 130 and the liquid crystal layer 135.

The first substrate 130 includes a first insulating substrate 100 and a plurality of thin film transistors (TFTs) 115 formed on the first insulating substrate 100. The first insulating substrate 100 comprises a non-conductive material such as glass or ceramic material. Each of the TFTs 115 includes a gate electrode 102, a gate insulating layer 104, an active pattern 106, an ohmic contact pattern 108, a source electrode 110 and a drain electrode 112.

The gate electrode 102 of the TFT 115 is branched from a gate line (not shown) extended in a first direction. The gate insulating layer 104 is formed on an entire surface of the first insulating substrate 100 on which the gate electrode 102 is formed. The gate insulating layer 104 comprises an inorganic material such as silicon nitride. An active pattern 106 and an ohmic contact pattern 108 are successively formed on the gate insulating layer 104 where the gate electrode 102 is located. The active pattern 106 comprises amorphous silicon and the ohmic contact pattern 108 comprises $n^+$ doped amorphous silicon. A drain electrode 110 and a source electrode 112 are formed on the ohmic contact pattern 108 and the gate insulating layer 104 as shown in FIG. 10.

An organic insulating layer 116 comprised of a photosensitive acrylic resin or resist are successively formed on the first insulating layer 100 on which the TFTs 115 are formed. A first embossing pattern is formed on the organic insulating layer 116. The first embossing pattern has a plurality of embossing portions each having inclined face inclined asymmetrically in 12, 9, 6 or 3 o'clock directions. Namely, the embossing portions are arranged repeatedly on the organic insulating layer 116. A contact hole 118 for exposing a portion of the drain electrode is formed through the organic insulating layer 116.

The reflective electrode 120 is formed on the organic insulating layer 116 and the contact hole 118. The reflective electrode 120 makes contact with the drain electrode 112 through the contact hole 118 to be electrically connected to the TFT 115.

The reflective electrode 120 has embossing portions corresponding to each of the embossing portions of the organic insulating layer 116. The reflective electrode 120 has a second embossing pattern that includes the embossing portions corresponding to each of the embossing portions of the organic insulating layer 116 so as to enhance the reflectivity of incident light incident into the LCD panel in various directions.

Each of the embossing portions has inclined faces inclined asymmetrically in a plurality of directions so as to enhance the reflectivity in various directions. For example, as shown in FIG. 10, the reflective electrode 120 includes embossing portion 122a for enhancing the reflectivity in 9 o'clock, embossing portion 122b for enhancing the reflectivity in 6 o'clock, embossing portion 122c for enhancing the reflectivity in 3 o'clock, embossing portion (not shown) for enhancing the reflectivity in 12 o'clock. A first orientation layer (not shown) is stacked on the entire surface of the reflective electrode 120 having the resultant structure. The second substrate 140 includes a second insulating substrate 142 comprised of the same material as in the first insulating substrate 100, color filters 144, a common electrode 146 and a second orientation layer (not shown). The color filter 144 is disposed on a lower surface of the second insulating substrate 142, the common electrode 146 and the second orientation layer is disposed successively under the color filter 144, to thereby complete the second substrate 140. Spacers (not shown) are formed between the first substrate 130 and the second substrate 140 to maintain a cell gap between the first and the second substrates 130 and 140. The liquid crystal layer is formed between the first substrate 130 and the second substrate 140, to thereby complete the reflective type LCD device.

FIGS. 11A, 11B, 11C and 11D are cross-sectional views showing a process of manufacturing the LCD panel of FIG. 10. In FIGS. 11A, 11B, 11C and 11D, the same reference numerals denote the same elements in FIG. 10.

Figure 11A:
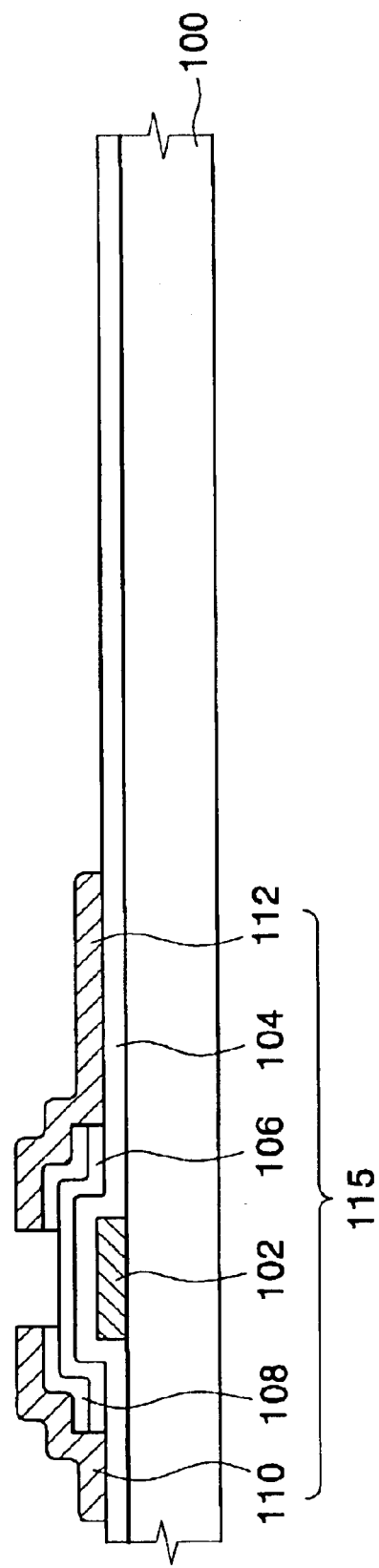

Referring to FIG. 11A, after depositing a gate metal layer on the first insulating substrate 100 comprised of an insulation material such as glass, quartz or ceramic, the gate metal layer is patterned by a photolithography process to form the gate line (not shown) extended in a first direction and the gate electrode 102 branched from the gate line. The first metal layer may include chrome (Cr) and aluminum-neodymium (Al—Nd).

Silicon nitride is deposited to a predetermined thickness by a plasma-enhanced chemical vapor deposition (PECVD) method on the entire surface of the first insulating substrate 100 on which the gate electrode 102 is formed, thereby forming a gate insulating layer 104.

An active layer, e.g., an amorphous silicon layer, is deposited by the PECVD method on the gate insulation layer 104, and then, an ohmic contact layer, e.g., an $n^+$ doped amorphous silicon layer, is deposited by the PECVD method on the active layer. Next, the active layer and the ohmic contact layers are patterned by photolithography process to form an active pattern 106 and an ohmic contact pattern 108 on the gate insulating layer 104 over the gate electrode 102.

After depositing a metal layer on the ohmic contact pattern 108 and the gate insulation layer 104, the metal layer is patterned by a photolithography process to form a data line (not shown) crossing the gate line, source and drain electrodes 110 and 112 branched from the data line. The second metal layer may comprise chrome (Cr), chrome-aluminum (Cr—Al) or chrome-aluminum-chrome (Cr—Al—Cr). Subsequently, the ohmic contact pattern 108 exposed between the source electrode 110 and the drain electrode 112 is removed by a reactive ion etching (RIE) method, thereby completing the TFT 115 having the gate electrode 102, gate insulating layer 104, active pattern 106, ohmic contact layer pattern 108, source electrode 110 and drain electrode 112. The gate insulating layer 104 is interposed between the gate line and the data line, thereby preventing the gate line and the data line from making contact with each other.

As illustrated above, the active pattern 106, ohmic contact pattern 108, source electrode 110 and drains electrode 112 may be formed by means of two masks. However, the active pattern 106, ohmic contact pattern 108, source electrode 110 and drains electrode 112 may be formed by means of one mask.

In addition, although the above embodiments show a TFT having bottom gate structure, a TFT having a top gate structure may also be utilized in place of the TFT having bottom gate structure.

Referring to FIG. 11b, an organic insulating layer 116 comprised of a resist or photosensitive acrylic resin are coated to a thickness of more than 2 μm on the entire surface of first insulating substrate 100 on which the TFTs 115 are formed.

After a mask (not shown) having a pattern corresponding to a contact hole is positioned over the organic insulating layer 116 so as to form the contact hole through the organic insulating layer 116, a portion of the organic insulating layer 116 over the drain electrode 112 is primarily exposed by a full exposure process (an exposure process performed at an exposure amount sufficient for fully exposing the organic insulating layer 116). Next, the organic insulating layer 116 is exposed by means of another mask (not shown) for forming the embossing pattern (or micro lenses), thereby forming the contact hole 118 and the embossing portions.

Figure 11C:
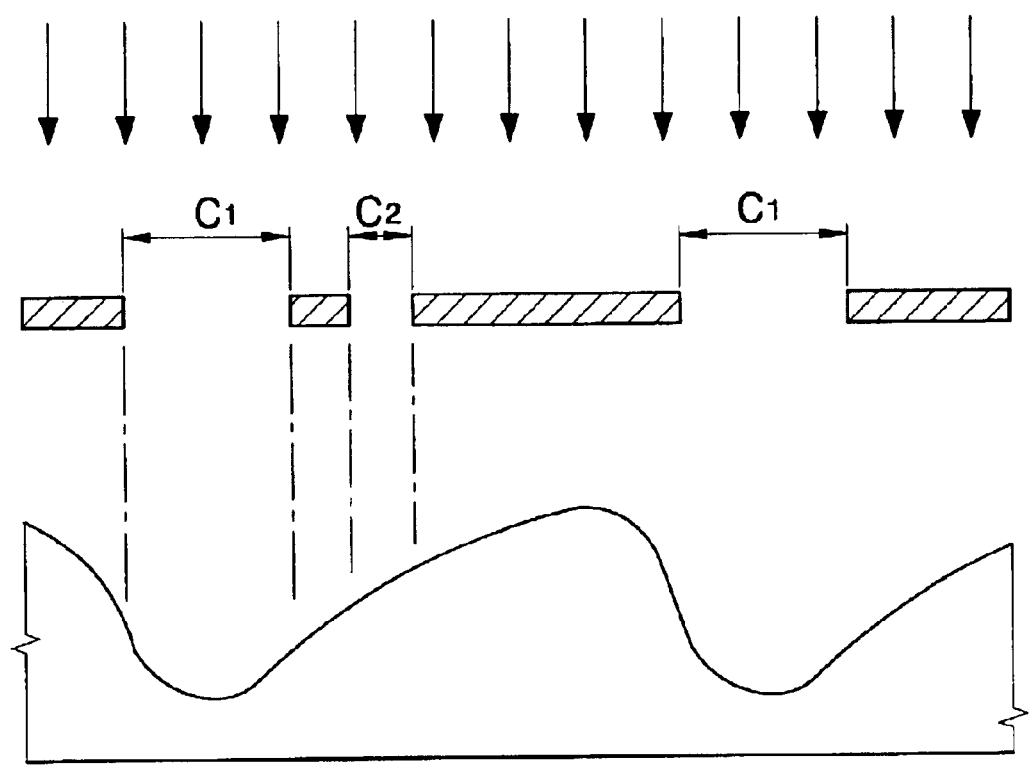

Hereinafter, a method of forming the embossing portions on the organic insulating layer 116 will be illustrated with reference to FIG. 11C.

First, a mask (not shown) for forming the embossing portions in various directions on the organic insulating layer 116 is positioned over the organic insulating layer 116. A portion of the organic insulating layer 116 besides the contact hole is exposed by lens exposure process by means of the mask. The exposure amount is increase to be supplied to the first region C1 corresponding to the concave portion, thereby forming a groove or the concave portion on the insulating layer 116. A region on the insulating layer 116 corresponding to the second region C2 is exposed and developed using a slit mask or a half-tone mask, thereby forming the embossing portions having inclined faces inclined asymmetrically on the insulating layer 116.

Figure 11D:
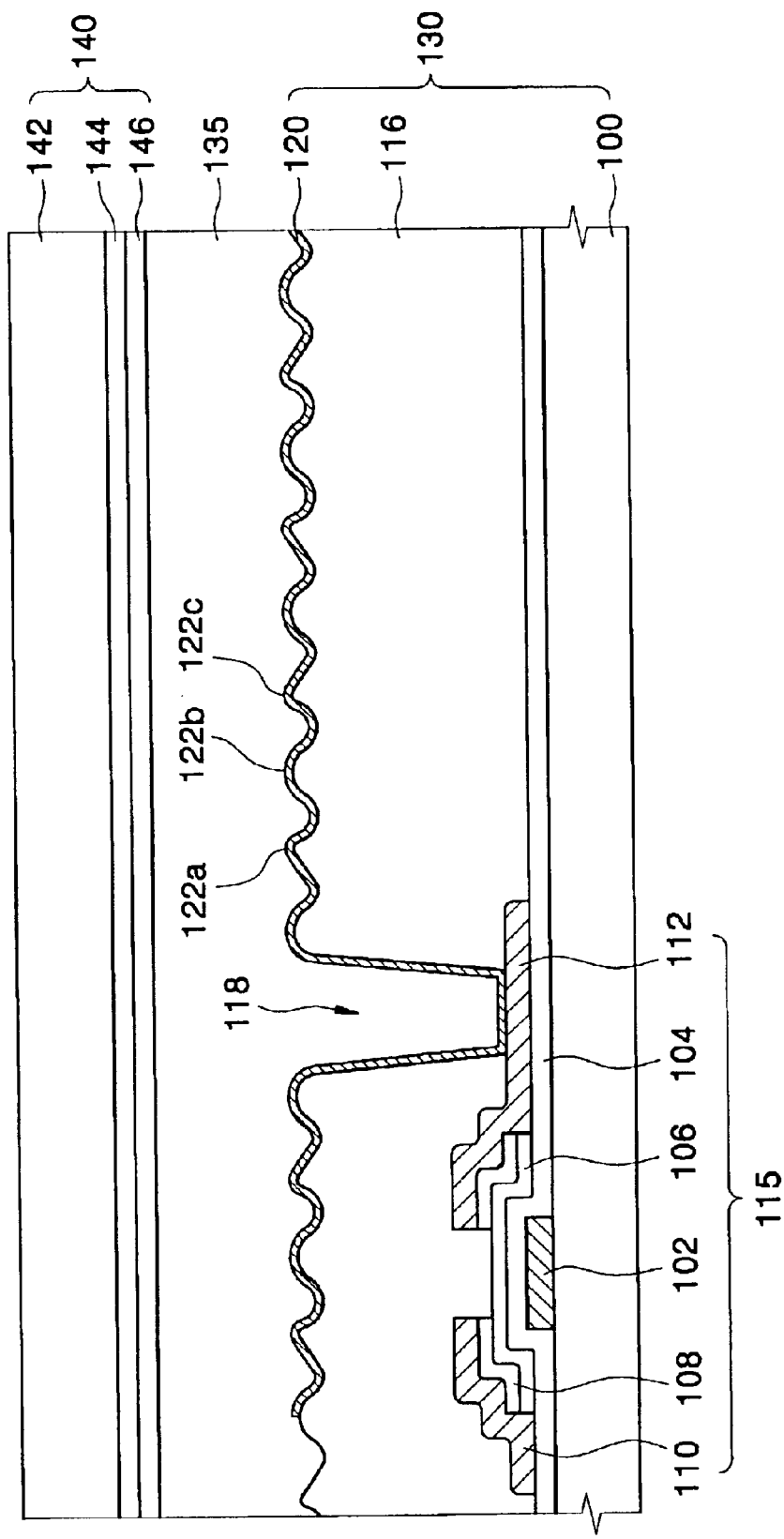

Referring to FIG. 11D, after depositing a metal layer comprised of a high reflective metal such as aluminum (Al), silver (Ag) or aluminum-neodymium (AlNd), the metal layer is patterned by a photolithography process to form the reflective electrode 120.

The reflective electrode 120 has the same shape as the surface of the organic insulating layer 116. Namely, an embossing portion corresponding to each of the embossing portions of the organic insulating layer 116 has an inclined face inclined asymmetrically in various directions. Then, a first orientation layer (not shown) is formed on the entire surface of the reflective electrode 120 having the resultant structure.

Next, the color filters 144, common electrode 146 and the second orientation layer (not shown) are successively formed on the second insulating substrate 142, thereby completing the second substrate 140. Then, the second substrate 140 is disposed opposite to the first substrate 130, spacers (not shown) are interposed between the first and second substrates 130 and 140, and the first and second substrates 130 and 140 are combined each other. The liquid crystal may be injected into the space between the first and second substrates 130 and 140 by vacuum injection method using vacuum pressure, thereby completing the reflective type LCD device.

Figure 12:
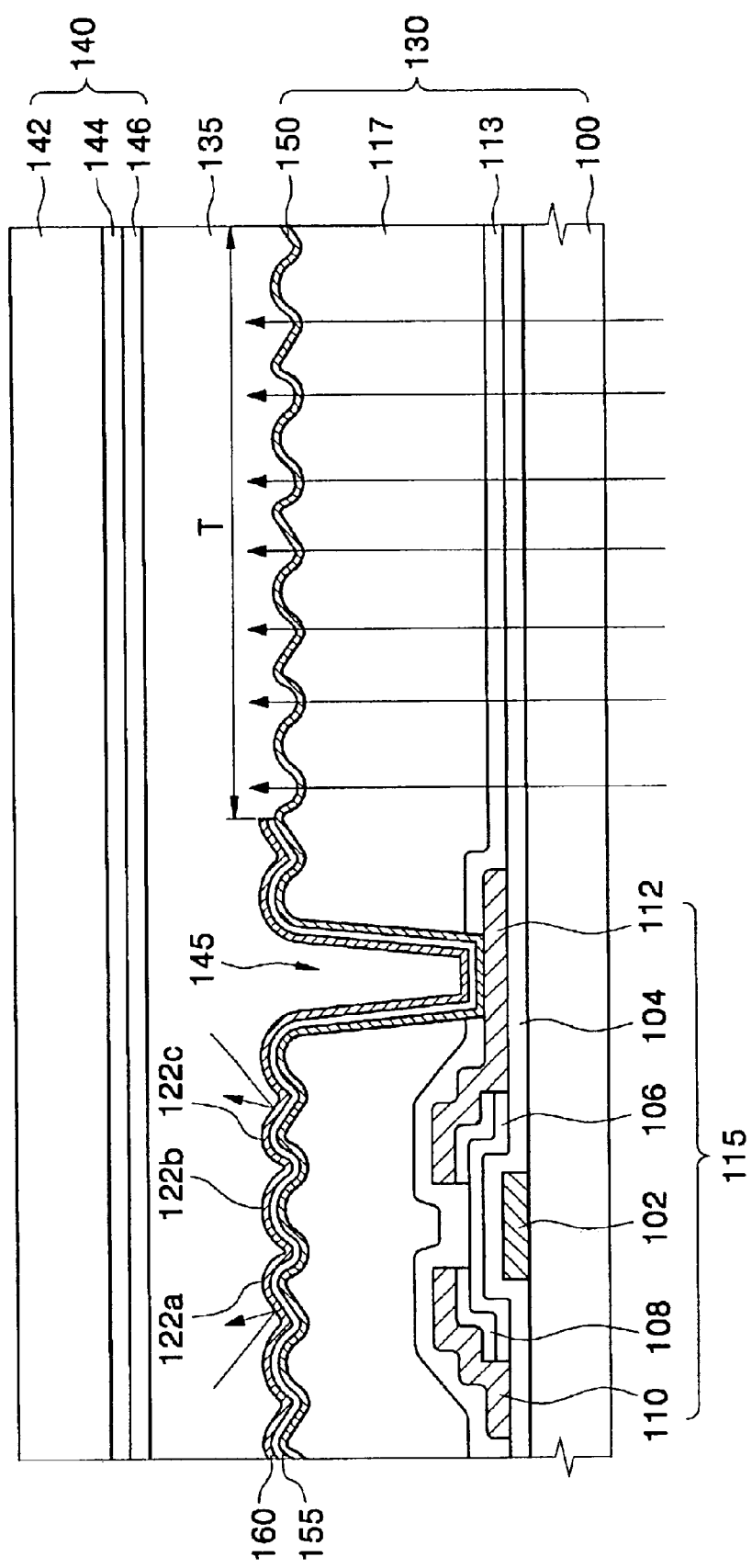
FIG. 12 is a cross-sectional view showing one pixel of a reflective and transmissive type LCD panel having the reflective electrode that has the embossing pattern in FIG. 4A.

FIG. 12 is a cross-sectional view showing one pixel of a reflective and transmissive type LCD panel having the reflective electrode that has the embossing pattern in FIG. 4A.

Referring to FIG. 12, in the pixel region of the reflective and transmissive type LCD device, TFTs 115 are formed on a first insulating substrate 100, an inorganic insulating layer 113 is formed on an entire surface of the first insulating substrate 100 on which the TFT 115 is formed, and an organic insulating layer 117 having embossing portions is formed on the inorganic insulating layer 113. A transmitting (or transparent) electrode 150 having embossing portions corresponding to the embossing portions of the organic insulating layer 117, a barrier metal layer pattern 155 and a reflective electrode 160 are successively formed on the organic insulating layer 117 having the resultant structure.

An embossing pattern is formed on the organic insulating layer 117. The embossing pattern has a plurality of embossing portions each having inclined face inclined asymmetrically in 12, 9, 6 or 3 o'clock directions. Namely, the embossing portions are arranged repeatedly on the organic insulating layer 117.

A region where the transmitting electrode 150 exists only is a transmitting (or transparent) window (T) to operate as a transmitting (or transparent) region. An external light generated from an external light source transmits the transmitting window (T) and advances toward the second substrate formed over the first substrate. A region where the reflective electrode 160 exists only operates as a reflecting region. Sunlight is reflected on the reflecting region and advances toward the second substrate.

The reflective electrode 160 has embossing portions corresponding to each of the embossing portions of the organic insulating layer 117. The reflective electrode 160 has a second embossing pattern that includes the embossing portions corresponding to each of the embossing portions of the organic insulating layer 117 so as to enhance the reflectivity of incident light incident into the LCD panel in various directions. Each of the embossing portions of the reflective electrode 160 has inclined faces inclined asymmetrically in a plurality of directions so as to enhance the reflectivity in various directions. For example, as shown in FIG. 12, the reflective electrode 160 includes embossing portion 122a for enhancing the reflectivity in 9 o'clock, embossing portion 122b for enhancing the reflectivity in 6 o'clock, embossing portion 122c for enhancing the reflectivity in 3 o'clock, embossing portion (not shown) for enhancing the reflectivity in 12 o'clock.

As shown in FIG. 10, a color filter 144, a common electrode 146 and a second orientation layer (not shown) is formed on the second insulating substrate 142, and a liquid crystal layer 135 is formed between the first substrate 130 and the second substrate 140, thereby completing the reflective and transmissive type LCD device.

FIGS. 13A, 13B, 13C and 13D are cross-sectional views showing a process of manufacturing the LCD panel of FIG. 12.

Figure 13A:
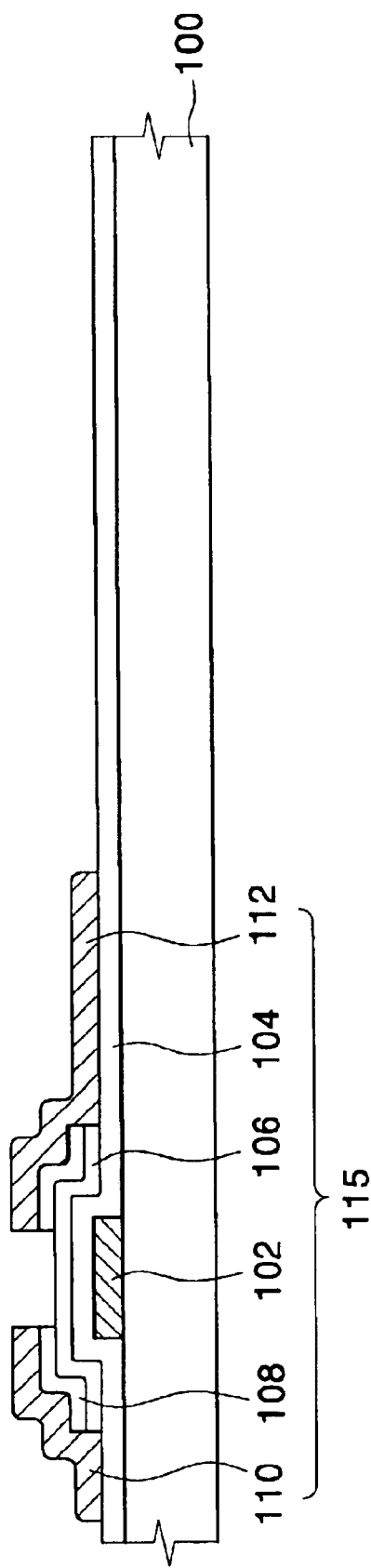
FIGS. 13A, 13B, 13C and 13D are cross-sectional views showing a process of manufacturing the LCD panel of FIG. 12.

Referring to FIG. 13A, a TFT 115 is formed by the process of manufacturing the TFT illustrated in FIG. 11A.

Figure 13B:
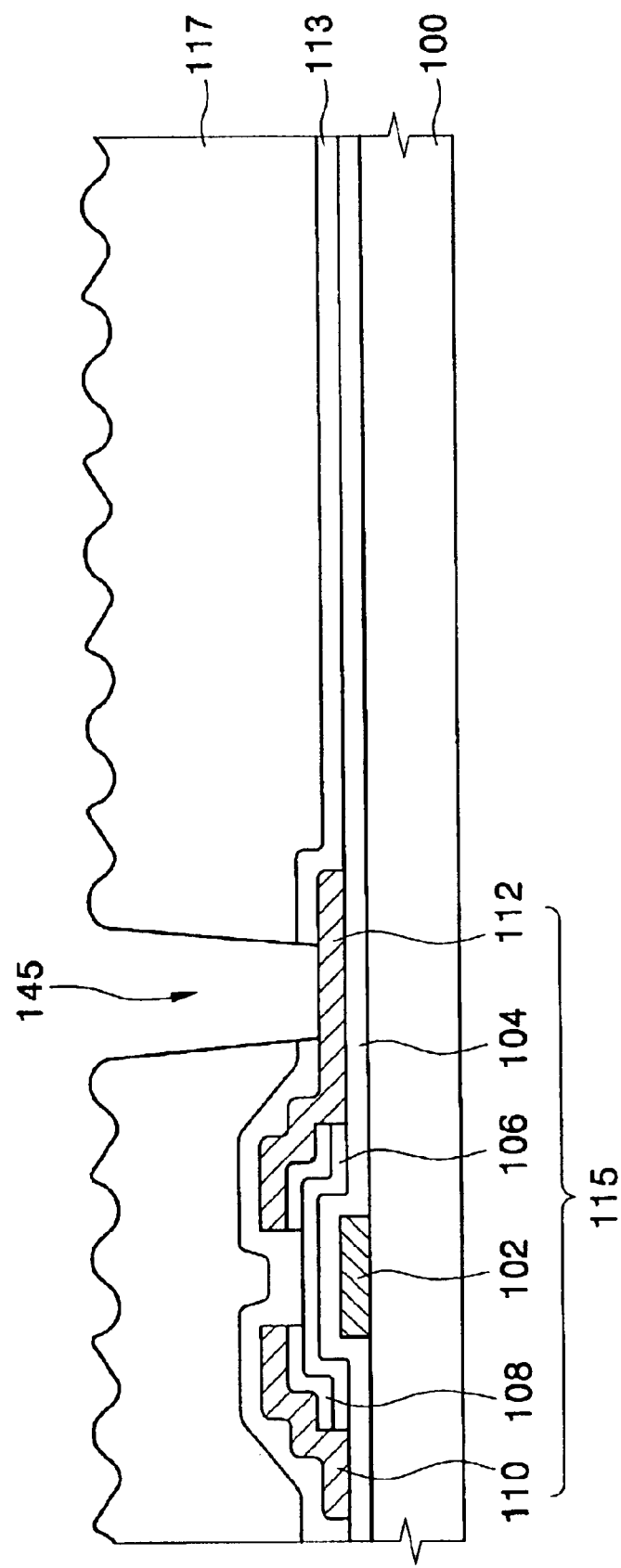
Figure 13C:
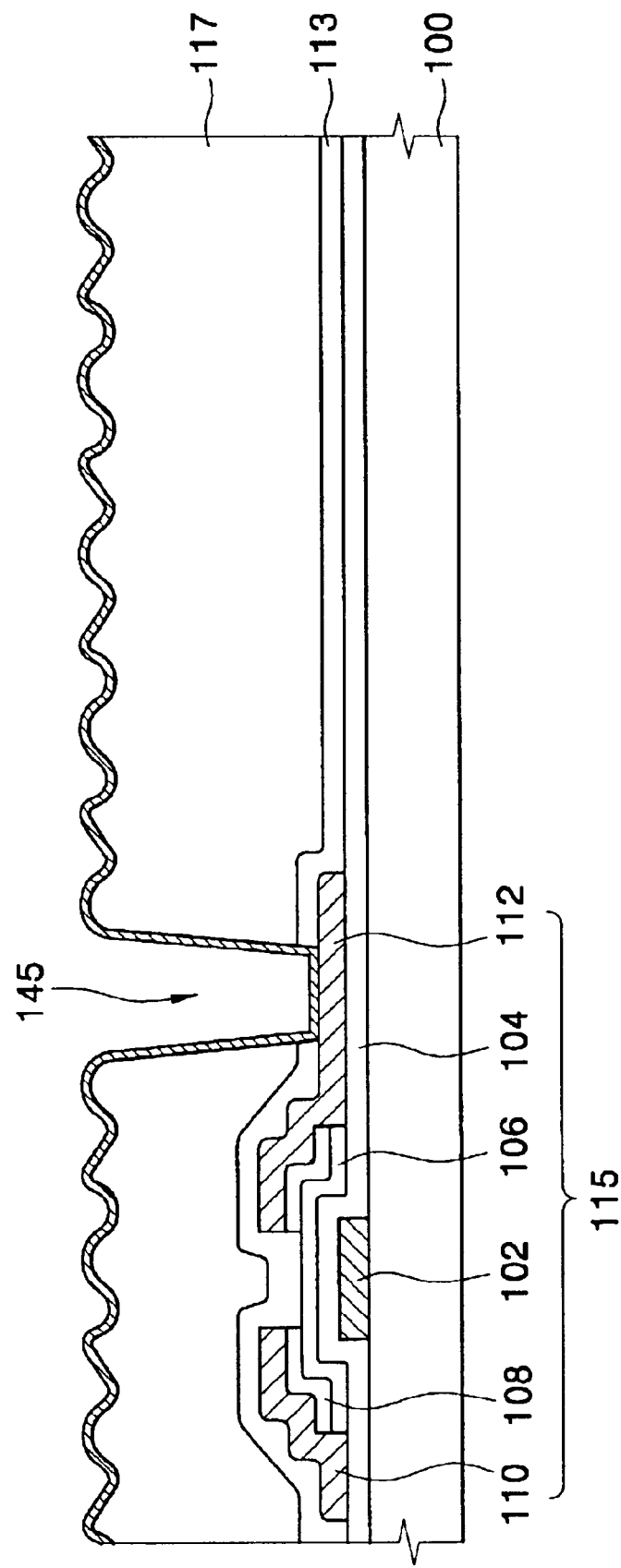

Referring to FIG. 13B, after inorganic insulating layer 113 is deposited on the gate insulating layer 104, the inorganic insulating layer 113 formed on the drain electrode 112 is etched away through a photolithography process. The organic insulating layer 117 is formed on the entire surface of the resultant structure, the organic insulating layer 117 formed on the drains electrode 112 is removed through exposure and developing process, thereby forming a contact hole 145 which expose a portion of the drain electrode 112. A plurality of embossing portions, for example the embossing portions for enhancing the reflectivity in 9, 6, 12 and 3 o'clock directions as shown in FIG. 13B, may be formed on the surface of the organic insulating layer 117 by means of a photomask pattern for forming the embossing pattern according to the present invention.

Referring to FIG. 13, a transparent conductive layer such as indium tin oxide (ITO) or indium zinc oxide (IZO) is deposited on the entire surface of the resultant structure, thereby forming the transmitting electrode 150.

Figure 13D:
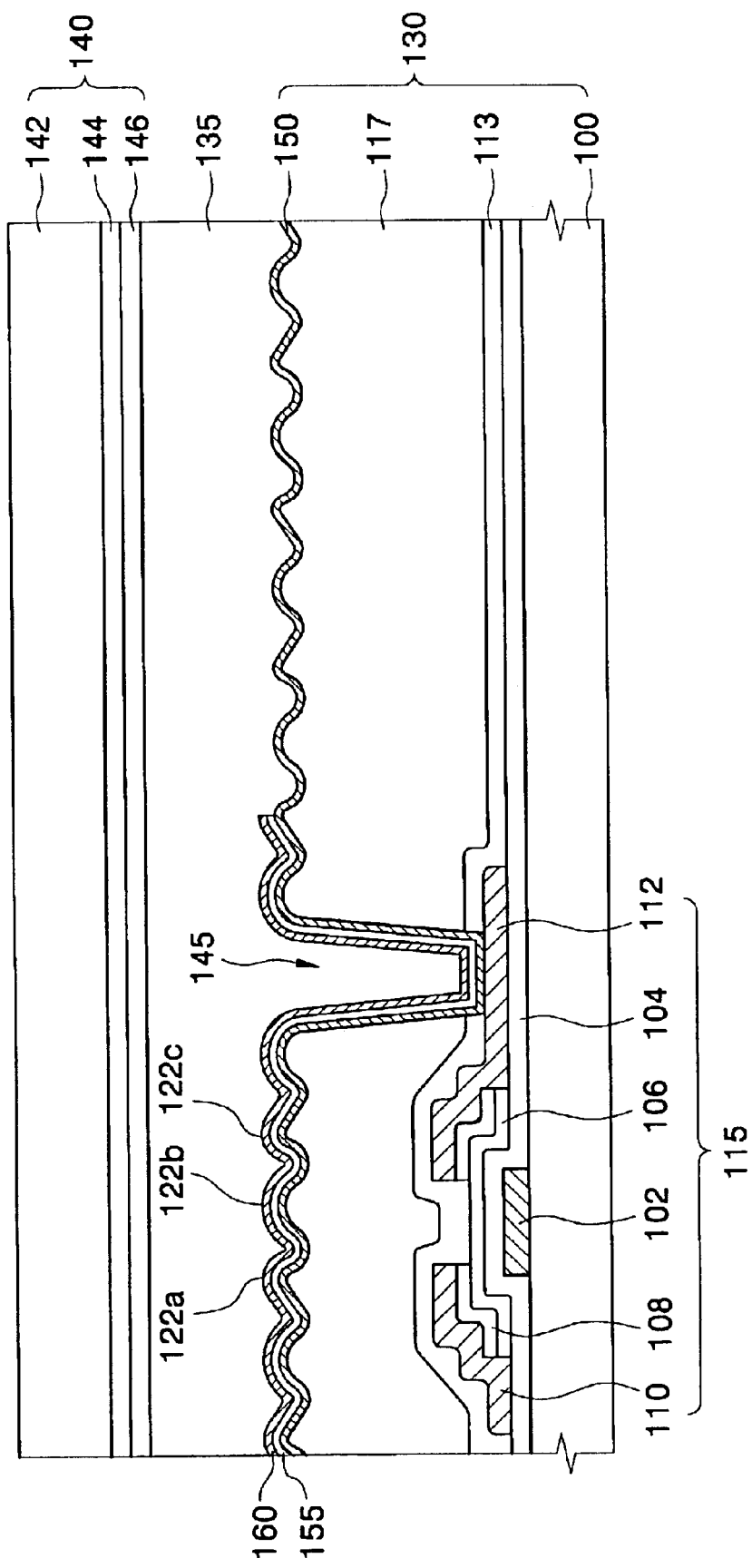

Referring to FIG. 13D, a barrier metal layer is formed on the organic insulating layer 117 and the transmitting (or transparent) layer 150 having the above embossing portions. The barrier metal layer may be comprised of a metal having an etching rate similar to that of a reflective layer with respect to a predetermined etchant for etching the reflective layer. Preferably, the barrier metal layer may be comprised of molybdenum-tungsten (Mo—W). Then, the reflective layer and the barrier metal layer are patterned by the photolithography and wet etching processes, thereby forming a reflective electrode 160 and the barrier metal layer pattern 155. The reflective electrode 160 and the barrier metal layer pattern 155 connected to the drain electrode 112 through the contact hole 145 and have a transmitting window (T) which exposes a portion of the transmitting electrode 150 under the reflective layer.

As shown in FIG. 10, after a color filter 144, a common electrode 146 and a second orientation layer (not shown) is formed on the second insulating substrate 142, a liquid crystal layer 135 is formed between the first substrate 130 and the second substrate 140, thereby completing the reflective and transmissive type LCD device.

While the exemplary embodiments of the present invention and its advantages have been described in detail, it should be understood that various changes, substitutions and alterations can be made herein without departing from the spirit and scope of the invention as defined by appended claims.

What is claimed is:

1. A liquid crystal display device comprising:
a first substrate;
an insulating layer formed on the first substrate, a first embossing member and a second embossing member being arranged repeatedly on the insulating layer to form a first embossing pattern, the first embossing member having a first inclined face inclined asymmetrically in a first direction, and the second embossing member having a second inclined face inclined asymmetrically in a second direction;
a reflective electrode formed on the insulating layer, a third embossing member being arranged repeatedly on the reflective electrode to form a second embossing pattern, the third embossing member corresponding to the first and second embossing members;
a second substrate facing the first substrate; and
a liquid crystal layer interposed between the first and second substrates.

2. The liquid crystal display device of claim 1, wherein the first direction substantially perpendicular to the second direction.

3. The liquid crystal display device of claim 1, wherein the first embossing pattern further includes a fourth embossing member having a third inclined face inclined asymmetrically in a third direction substantially opposite to the first direction, the fourth embossing member being disposed on a same plane as the first and second embossing members.

4. The liquid crystal display device of claim 3, wherein the first embossing pattern further includes a fifth embossing member having a fourth inclined face inclined asymmetrically in a fourth direction substantially opposite to the second direction, the fifth embossing member being disposed on a same plane as the fourth embossing members.

5. A liquid crystal display device comprising:
a first substrate including a switching device;
an insulating layer formed on the first substrate, a first embossing member and a second embossing member being arranged repeatedly on the insulating layer to form a first embossing pattern, the first embossing member having a first inclined face inclined asymmetrically in a first direction, and the second embossing member having a second inclined face inclined asymmetrically in a second direction;
a transmitting electrode formed on the insulating layer, a third embossing member being arranged repeatedly on the transmitting electrode to form a second embossing pattern, the third embossing member corresponding to the first and second embossing members;
a reflective electrode formed on a portion of the transmitting electrode, a fourth embossing member being arranged repeatedly on the reflective electrode to form a third embossing pattern, the fourth embossing member corresponding to the third embossing member, and a contact hole electrically coupled with the switching device being formed on the portion of the transmitting electrode;
a second substrate facing the first substrate; and
a liquid crystal layer interposed between the first and second substrates.

6. The liquid crystal display device of claim 5, wherein the first direction substantially perpendicular to the second direction.

7. The liquid crystal display device of claim 5, wherein the first embossing pattern further includes a fifth embossing member having a third inclined face inclined asymmetrically in a third direction substantially opposite to the first direction, the fifth embossing member being disposed on a same plane as the first and second embossing members.

8. The liquid crystal display device of claim 7, wherein the first embossing pattern further includes a sixth embossing member having a fourth inclined face inclined asymmetrically in a fourth direction substantially opposite to the second direction, the sixth embossing member being disposed on a same plane as the fifth embossing members.

9. A liquid crystal display device comprising:
a first substrate having a plurality of pixels arranged in a matrix shape;
a second substrate facing the first substrate and including a red color filter, a green color filter and a blue color filter arranged repeatedly thereon, the red, green and blue color filters corresponding to each of the pixels;
a liquid crystal layer interposed between the first and second substrates;
an insulating layer formed on the first substrate, a first embossing member being arranged repeatedly on the insulating layer to form a first embossing pattern, the first embossing member having a plurality of inclined faces inclined asymmetrically in a plurality of directions, and the first embossing pattern corresponding to each of the red, green and blue color filters; and
a reflective electrode formed on the insulating layer, a second embossing member being arranged repeatedly on the reflective electrode to form a second embossing pattern, the second embossing member corresponding to the first embossing member.

10. The liquid crystal display device of claim 9, wherein the second embossing pattern is formed on the reflective electrode so as to correspond to each of the red, green and blue color filters.

11. The liquid crystal display device of claim 10, wherein a plurality of embossing members is formed on the insulating layer to correspond to the green color filter or the blue color filter adjacent to the red color filter, the embossing members being arranged repeatedly on the insulating layer to have a same pattern to the first embossing pattern corresponding to the red color filter.

12. The liquid crystal display device of claim 10, wherein a plurality of embossing members is formed on the insulating layer to correspond to the green color filter or the blue color filter adjacent to the red color filter, the embossing members being arranged repeatedly on the insulating layer to have a different pattern from the first embossing pattern corresponding to the red color filter.

13. The liquid crystal display device of claim 9, wherein insulating layers corresponding to successive three pixels belonging to a same column of the matrix have a same embossing pattern.

14. The liquid crystal display device of claim 9, wherein insulating layers corresponding to successive three pixels belonging to a same low of the matrix have a same embossing pattern.

15. A liquid crystal display device comprising:
a first substrate having a plurality of pixels arranged in a matrix shape;
a second substrate facing the first substrate and including a red color filter, a green color filter and a blue color filter arranged repeatedly thereon, the red, green and blue color filters corresponding to each of the pixels;

a liquid crystal layer interposed between the first and second substrates;

an insulating layer formed on the first substrate, a first embossing member being arranged repeatedly on the insulating layer to form a first embossing pattern, the first embossing member having a plurality of inclined faces inclined asymmetrically in a plurality of directions, and the first embossing pattern corresponding to each of the red, green and blue color filters;

a transmitting electrode formed on the insulating layer, a second embossing member being arranged repeatedly on the transmitting electrode to form a second embossing pattern, and the second embossing member corresponding to the first embossing member; and a reflective electrode formed on a portion of the transmitting electrode, a third embossing member being arranged repeatedly on the reflective electrode to form a third embossing pattern, the third embossing member corresponding to the second embossing member, and a contact hole electrically coupled with the switching device being formed on the portion of the transmitting electrode.

16. The liquid crystal display device of claim 15, wherein the second embossing pattern is formed on the reflective electrode so as to correspond to each of the red, green and blue color filters.

17. The liquid crystal display device of claim 16, wherein a plurality of embossing members is formed on the insulating layer to correspond to the green color filter or the blue color filter adjacent to the red color filter, the embossing members being arranged repeatedly on the insulating layer to have a same pattern to the first embossing pattern corresponding to the red color filter.

18. The liquid crystal display device of claim 16, wherein a plurality of embossing members is formed on the insulating layer to correspond to the green color filter or the blue color filter adjacent to the red color filter, the embossing members being arranged repeatedly on the insulating layer to have a different pattern from the first embossing pattern corresponding to the red color filter.

19. The liquid crystal display device of claim 15, wherein insulating layers corresponding to successive three pixels belonging to a same column of the matrix have a same embossing pattern.

20. The liquid crystal display device of claim 15, wherein insulating layers corresponding to successive three pixels belonging to a same low of the matrix have a same embossing pattern.

21. A liquid crystal display device comprising:

a first substrate;

an insulating layer formed on the first substrate, the insulating layer including a first embossing member and a second embossing member arranged repeatedly thereon to form a first embossing pattern, the first embossing member having a first inclined face, the second embossing member having a second inclined face, the second inclined face being asymmetrically inclined with respect to the first inclined face, and cross-sections of the first and second embossing members having polygonal shapes;

a reflective electrode formed on the insulating layer, a third embossing member being arranged repeatedly on the reflective electrode to form a second embossing pattern, the third embossing member corresponding to the first and second embossing members;

a second substrate facing the first substrate; and a liquid crystal layer interposed between the first and second substrates.

22. The liquid crystal display device of claim 21, wherein the first inclined face inclined in a first direction, and the second inclined face inclined in a second direction different from the first direction.

23. A liquid crystal display device comprising:

a first substrate including a switching device;

an insulating layer formed on the first substrate, the insulating layer including a first embossing member and a second embossing member arranged repeatedly thereon to form a first embossing pattern, the first embossing member having a first inclined face, the second embossing member having a second inclined face, the second inclined face being asymmetrically inclined with respect to the first inclined face, and cross-sections of the first and second embossing members having polygonal shapes;

a transmitting electrode formed on the Insulating layer, a third embossing member being arranged repeatedly on the transmitting electrode to form a second embossing pattern, the third embossing member corresponding to the first and second embossing members;

a reflective electrode formed on a portion of the transmitting electrode, a fourth embossing member being arranged repeatedly on the reflective electrode to form a third embossing pattern, the fourth embossing member corresponding to the third embossing member, and a contact hole electrically coupled with the switching device being formed on the portion of the transmitting electrode;

a second substrate facing the first substrate; and a liquid crystal layer interposed between the first and second substrates.

24. The liquid crystal display device of claim 23, wherein the first inclined face inclined in a first direction, and the second inclined face inclined in a second direction different from the first direction.

* * * * *